United States Patent
Xie et al.

(10) Patent No.: US 12,137,438 B2
(45) Date of Patent: Nov. 5, 2024

(54) COMMUNICATION METHOD AND APPARATUS

(71) Applicant: HUAWEI TECHNOLOGIES CO., LTD., Shenzhen (CN)

(72) Inventors: Xinqian Xie, Beijing (CN); Zhiheng Guo, Beijing (CN); Yongqiang Fei, Shenzhen (CN); Wenping Bi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 575 days.

(21) Appl. No.: 17/373,085

(22) Filed: Jul. 12, 2021

(65) Prior Publication Data
US 2021/0345312 A1  Nov. 4, 2021

Related U.S. Application Data

(63) Continuation of application No. PCT/CN2020/072090, filed on Jan. 14, 2020.

(30) Foreign Application Priority Data

Jan. 18, 2019 (CN) .......................... 201910049798.1

(51) Int. Cl.
*H04W 72/044* (2023.01)
*H04W 72/30* (2023.01)

(52) U.S. Cl.
CPC ......... *H04W 72/044* (2013.01); *H04W 72/30* (2023.01)

(58) Field of Classification Search
CPC ... H04W 72/044; H04W 72/30; H04W 72/20; H04J 11/0073; H04J 11/0076; H04L 5/0048; H04L 5/0053
See application file for complete search history.

(56) References Cited

U.S. PATENT DOCUMENTS

2015/0016239 A1   1/2015  Yi et al.
2018/0175904 A1*  6/2018  Ko ........................ H04L 5/0073
(Continued)

FOREIGN PATENT DOCUMENTS

CA      3031087 A1    11/2018
CN      105635018 A    6/2016
(Continued)

OTHER PUBLICATIONS

Remaining details on synchronization signal, R1-1717576, Samsung, 3GPP TSG RAN WG1#90b, Prague, Czech Republic, Oct. 9-13, 2017 (Year: 2017).*

(Continued)

*Primary Examiner* — Harry H Kim
*Assistant Examiner* — Mohammed M Murshid
(74) *Attorney, Agent, or Firm* — HAUPTMAN HAM, LLP

(57) ABSTRACT

A communication method includes determining, by a network device, a first signal. The first signal includes a primary synchronization signal PSS, a secondary synchronization signal SSS, and a first physical broadcast channel PBCH. A frequency domain bandwidth occupied by the PSS, the SSS, and the first PBCH is less than 240 subcarriers. The PSS, the SSS, and the first PBCH are mapped to different time-domain symbols. The method also includes sending, by the network device, the first signal.

20 Claims, 18 Drawing Sheets

(56) References Cited

U.S. PATENT DOCUMENTS

| | | |
|---|---|---|
| 2018/0302182 A1 | 10/2018 | Ly et al. |
| 2019/0044631 A1* | 2/2019 | Davydov ............. H04B 17/382 |
| 2020/0053781 A1* | 2/2020 | Pan ....................... H04W 72/30 |
| 2020/0169976 A1* | 5/2020 | Chong .................. H04W 76/11 |
| 2020/0220630 A1* | 7/2020 | Davydov ............. H04W 24/08 |

FOREIGN PATENT DOCUMENTS

| | | |
|---|---|---|
| CN | 106921468 A | 7/2017 |
| WO | 2017171365 A2 | 10/2017 |

OTHER PUBLICATIONS

3GPP TSG RAN WG1 Meeting 90bis, R1-1718526, Remaining details on synchronization signal design, Qualcomm Incorporated, Prague, Oct. 9-13, 2017, total 8 pages.

3GPP TSG-RAN WG4 Meeting #85, R4-1712101, RAN4#84Bis Meeting report, Dubrovnik, Croatia, Reno, US, Nov. 27-Dec. 1, 2017, total 645 pages.

3GPP TSG RAN WG1#90b, R1-1717576, Remaining details on synchronization signal, Samsung, Prague, Czech Republic, Oct. 9-13, 2017, total 9 pages.

3GPP TSG RAN WG1 Meeting #95, R1-1812208, Sidelink synchronization mechanisms for NR V2X, Huawei, HiSilicon, Spokane, USA, Nov. 12-16, 2018, total 6 pages.

Chinese Office Action issued in corresponding Chinese Application No. 201910049798.1, dated Dec. 17, 2020, pp. 1-9.

International Search Report issued in corresponding International Application No. PCT/CN2020/072090, dated Apr. 13, 2020, pp. 1-9.

* cited by examiner

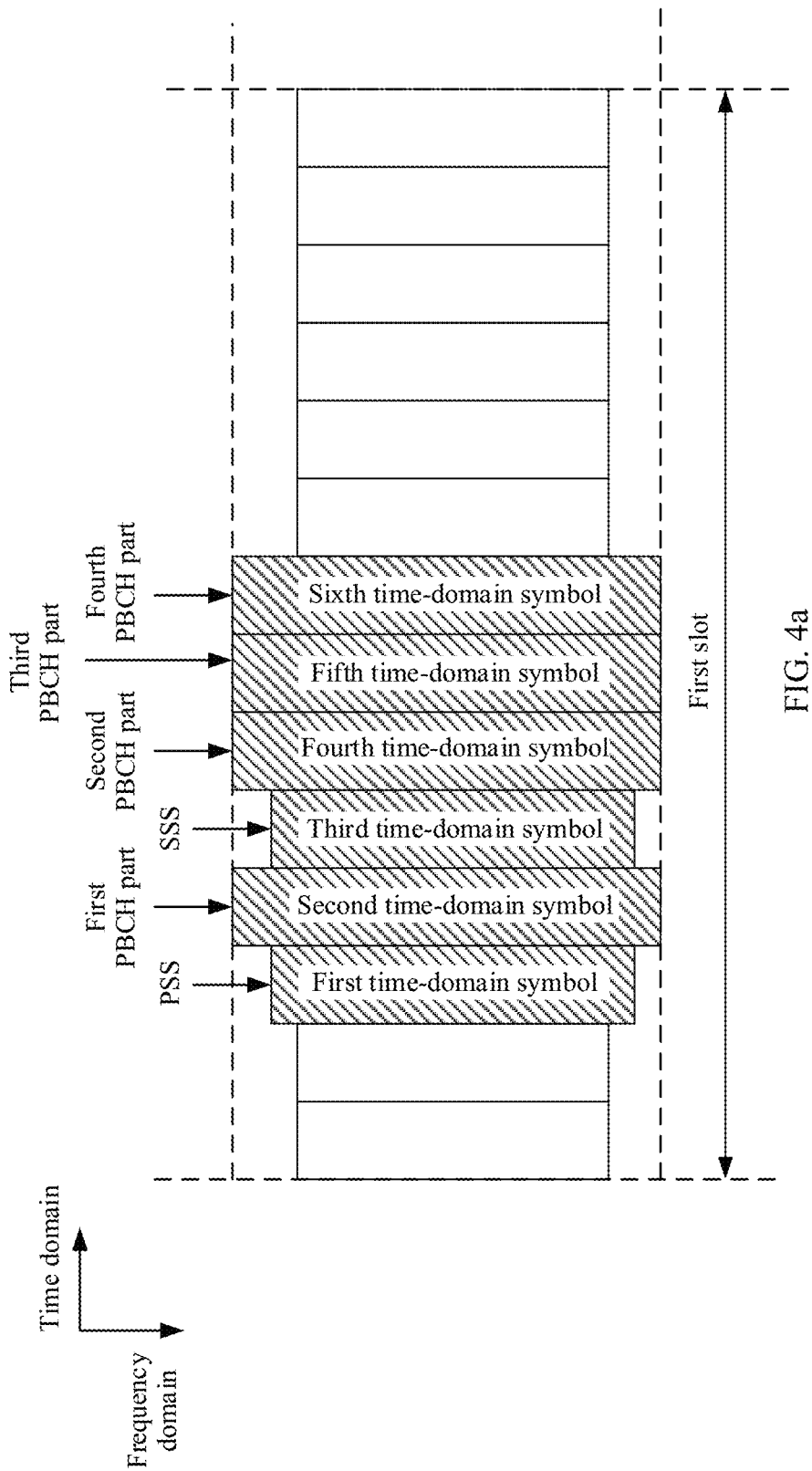

COMMUNICATION METHOD AND APPARATUS

CROSS-REFERENCE TO RELATED APPLICATIONS

This application is a continuation of International Application No. PCT/CN2020/072090, filed on Jan. 14, 2020. Which claims priority to Chinese Patent Application No. 201910049798.1, filed on Jan. 18, 2019. The disclosures of the aforementioned applications are hereby incorporated by reference in their entireties.

TECHNICAL FIELD

This application relates to the field of communication technologies, and in particular, to a communication method and an apparatus.

BACKGROUND

With evolution of a new radio (new radio, NR) system, a terminal device having a narrow bandwidth needs to be supported. For example, a frequency domain bandwidth of a terminal device serving machine type communication (machine type communication, MTC) is six resource blocks, and a frequency domain bandwidth of a terminal device serving an internet of things (internet of things, IoT) is one resource block. How to configure a first signal for the narrowband terminal device, namely, a terminal device whose frequency domain bandwidth is less than 240 subcarriers, is a current research hotspot.

SUMMARY

This application provides a communication method and an apparatus, to configure a first signal for a terminal device whose frequency domain bandwidth is less than 240 subcarriers.

According to a first aspect, a communication method is provided, and includes: determining, by a network device, a first signal, where the first signal includes a primary synchronization signal PSS, a secondary synchronization signal SSS, and a first physical broadcast channel PBCH, a frequency domain bandwidth occupied by the PSS, the SSS, and the first PBCH is less than 240 subcarriers, and the PSS, the SSS, and the first PBCH are mapped to different time-domain symbols; and sending, by the network device, the first signal.

It can be learned from the foregoing that, in this embodiment of this application, a frequency domain bandwidth occupied by the first signal is less than 240 subcarriers, so that the first signal can be configured for a terminal device whose frequency domain bandwidth is less than 240 subcarriers. For example, the first signal may also be referred to as a narrowband SSB, and the terminal device that supports the frequency domain bandwidth less than 240 subcarriers may also be referred to as a narrowband terminal device.

In a possible design, the first PBCH includes a first PBCH part, a second PBCH part, a third PBCH part, and a fourth PBCH part; and that the PSS, the SSS, and the first PBCH are mapped to different time-domain symbols includes: the PSS is mapped to a first time-domain symbol, the first PBCH part is mapped to a second time-domain symbol, the SSS is mapped to a third time-domain symbol, the second PBCH part is mapped to a fourth time-domain symbol, the third PBCH part is mapped to a fifth time-domain symbol, and the fourth PBCH part is mapped to a sixth time-domain symbol.

In a possible design, the first time-domain symbol to the fourth time-domain symbol are consecutive time-domain symbols in a first slot, and the fifth time-domain symbol and the sixth time-domain symbol are consecutive or non-consecutive time-domain symbols in the first slot; or the first time-domain symbol to the fourth time-domain symbol are consecutive time-domain symbols in a first slot, the fifth time-domain symbol and the sixth time-domain symbol are consecutive or non-consecutive time-domain symbols in a second slot, and the first slot is different from the second slot.

In a possible design, the method further includes: sending, by the network device, a second signal, where the second signal includes a second PBCH, the second PBCH includes a fifth PBCH part, a sixth PBCH part, the first PBCH part, and the second PBCH part, the fifth PBCH part and the sixth PBCH part are mapped to the second time-domain symbol, the third time-domain symbol, and the fourth time-domain symbol, and frequency domain resources of the fifth PBCH part and the sixth PBCH part do not overlap frequency domain resources of the first PBCH part, the SSS, and the second PBCH part.

It can be learned from the foregoing that, in this embodiment of this application, a first SSB may include the PSS, the SSS, the first PBCH, the second PBCH, a third PBCH, and a fourth PBCH, and a second SSB may include the PSS, the SSS, the first PBCH, the second PBCH, a fifth PBCH, and a sixth PBCH. The first SSB and the second SSB may share the PSS, the SSS, the first PBCH, and the second PBCH. Compared with a solution in which an SSB is separately configured for the first SSB and the second SSB, this solution can reduce resource consumption, and improve resource utilization.

In a possible design, the first PBCH includes a first PBCH part, a second PBCH part, a third PBCH part, and a fourth PBCH part; and that the PSS, the SSS, and the first PBCH are mapped to different time-domain symbols includes: the PSS is mapped to a first time-domain symbol, the SSS is mapped to a second time-domain symbol, the first PBCH part is mapped to a third time-domain symbol, the second PBCH part is mapped to a fourth time-domain symbol, the third PBCH part is mapped to a fifth time-domain symbol, and the fourth PBCH part is mapped to a sixth time-domain symbol.

In a possible design, the first time-domain symbol and the second time-domain symbol are consecutive or non-consecutive time-domain symbols in a first slot, and the third time-domain symbol to the sixth time-domain symbol are consecutive or non-consecutive time-domain symbols in the first slot; or the first time-domain symbol and the second time-domain symbol are consecutive or non-consecutive time-domain symbols in a first slot, the third time-domain symbol to the sixth time-domain symbol are consecutive or non-consecutive time-domain symbols in a second slot, and the first slot is different from the second slot.

In a possible design, the method further includes: sending, by the network device, a second signal, where the second signal includes a second PBCH, the second PBCH includes a fifth PBCH part, a sixth PBCH part, a seventh PBCH part, and an eighth PBCH part, the fifth PBCH part is mapped to a seventh time-domain symbol, the sixth PBCH part is mapped to an eighth time-domain symbol, the seventh PBCH part and the eighth PBCH part are mapped to the seventh time-domain symbol, the second time-domain symbol, and the eighth time-domain symbol, and frequency domain resources of the seventh PBCH part and the eighth PBCH part do not overlap frequency domain resources of the fifth PBCH part, the SSS, and the sixth PBCH part.

It can be learned from the foregoing that, a first SSB may include the PSS, the SSS, the first PBCH, the second PBCH, a third PBCH, and a fourth PBCH, a second SSB may include the PSS, the SSS, a fifth PBCH, a sixth PBCH, a seventh PBCH, and an eighth PBCH. The first SSB and the second SSB may share the PSS and the SSS. Compared with a solution in which the first SSB and the second SSB are separately configured, this solution can improve resource utilization and reduce resource consumption.

According to a second aspect, a communication method is provided, and includes: receiving, by a terminal device, a first signal, where the first signal includes a primary synchronization signal PSS, a secondary synchronization signal SSS, and a first physical broadcast channel PBCH, a frequency domain bandwidth occupied by the PSS, the SSS, and the first PBCH is less than 240 subcarriers, and the PSS, the SSS, and the first PBCH are mapped to different time-domain symbols; and processing, by the terminal device, the first signal.

It can be learned from the foregoing that, in this embodiment of this application, PBCHs are mapped and sent in different PBCH mapping sequences, so that terminal devices having different bandwidths can share a PBCH. For example, a broadband terminal device can obtain all broadcast messages by receiving a PBCH once. A narrowband terminal device can obtain all the broadcast messages only by receiving PBCHs twice, four times, or the like. Compared with a solution in which a PBCH is separately configured for the terminal devices having the different frequency domain bandwidths, this solution can improve resource utilization and reduce resource consumption.

In a possible design, the first PBCH includes a first PBCH part, a second PBCH part, a third PBCH part, and a fourth PBCH part; and
 that the PSS, the SSS, and the first PBCH are mapped to different time-domain symbols includes: the PSS is mapped to a first time-domain symbol, the first PBCH part is mapped to a second time-domain symbol, the SSS is mapped to a third time-domain symbol, the second PBCH part is mapped to a fourth time-domain symbol, the third PBCH part is mapped to a fifth time-domain symbol, and the fourth PBCH part is mapped to a sixth time-domain symbol.

In a possible design, the first time-domain symbol to the fourth time-domain symbol are consecutive time-domain symbols in a first slot, and the fifth time-domain symbol and the sixth time-domain symbol are consecutive or non-consecutive time-domain symbols in the first slot; or the first time-domain symbol to the fourth time-domain symbol are consecutive time-domain symbols in a first slot, the fifth time-domain symbol and the sixth time-domain symbol are consecutive or non-consecutive time-domain symbols in a second slot, and the first slot is different from the second slot.

In a possible design, the method further includes: receiving, by the terminal device, a second signal, where
 the second signal includes a second PBCH, the second PBCH includes a fifth PBCH part, a sixth PBCH part, the first PBCH part, and the second PBCH part, the fifth PBCH part and the sixth PBCH part are mapped to the second time-domain symbol, the third time-domain symbol, and the fourth time-domain symbol, and frequency domain resources of the fifth PBCH part and the sixth PBCH part do not overlap frequency domain resources of the first PBCH part, the SSS, and the second PBCH part.

In a possible design, the first PBCH includes a first PBCH part, a second PBCH part, a third PBCH part, and a fourth PBCH part; and
 that the PSS, the SSS, and the first PBCH are mapped to different time-domain symbols includes: the PSS is mapped to a first time-domain symbol, the SSS is mapped to a second time-domain symbol, the first PBCH part is mapped to a third time-domain symbol, the second PBCH part is mapped to a fourth time-domain symbol, the third PBCH part is mapped to a fifth time-domain symbol, and the fourth PBCH part is mapped to a sixth time-domain symbol.

In a possible design, the first time-domain symbol and the second time-domain symbol are consecutive or non-consecutive time-domain symbols in a first slot, and the third time-domain symbol to the sixth time-domain symbol are consecutive or non-consecutive time-domain symbols in the first slot; or the first time-domain symbol and the second time-domain symbol are consecutive or non-consecutive time-domain symbols in a first slot, the third time-domain symbol to the sixth time-domain symbol are consecutive or non-consecutive time-domain symbols in a second slot, and the first slot is different from the second slot.

In a possible design, the method further includes: receiving, by the terminal device, a second signal, where
 the second signal includes a second PBCH, the second PBCH includes a fifth PBCH part, a sixth PBCH part, a seventh PBCH part, and an eighth PBCH part, the fifth PBCH part is mapped to a seventh time-domain symbol, the sixth PBCH part is mapped to an eighth time-domain symbol, the seventh PBCH part and the eighth PBCH part are mapped to the seventh time-domain symbol, the second time-domain symbol, and the eighth time-domain symbol, and frequency domain resources of the seventh PBCH part and the eighth PBCH part do not overlap frequency domain resources of the fifth PBCH part, the SSS, and the sixth PBCH part.

According to a third aspect, a communication method is provided, and includes: mapping, by a network device, a first physical broadcast channel PBCH to a target time-frequency resource in a first mapping sequence; and sending, by the network device, the first PBCH on the target time-frequency resource, where the first mapping sequence is one of N mapping sequences, and N is a positive integer greater than 1.

In a possible design, N is a positive integer greater than or equal to 2, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, and the second mapping sequence is different from the first mapping sequence; and
 the first mapping sequence or the second mapping sequence is either of the following: the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; or the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource.

In a possible design, the method further includes: mapping, by the network device, a second PBCH to a target time-frequency resource in the second mapping sequence; and sending, by the network device, the second PBCH on the target time-frequency resource, where the second mapping sequence is one of the N mapping sequences, and the second mapping sequence is different from the first mapping sequence.

In a possible design, N is a positive integer greater than or equal to 4, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, a third mapping sequence, and a fourth mapping sequence, and the first mapping sequence, the second mapping sequence, the third mapping sequence, and the fourth mapping sequence are different from each other; and the first mapping sequence, the second mapping sequence, the third mapping sequence, or the fourth mapping sequence is one of the following:

the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource; the first PBCH part is mapped to the first time-frequency resource, the second PBCH part is mapped to the second time-frequency resource, the third PBCH part is mapped to the fourth time-frequency resource, and the fourth PBCH part is mapped to the third time-frequency resource; or the first PBCH part is mapped to the fourth time-frequency resource, the second PBCH part is mapped to the third time-frequency resource, the third PBCH part is mapped to the first time-frequency resource, and the fourth PBCH part is mapped to the second time-frequency resource. In a possible design, the method further includes: mapping, by the network device, the second PBCH to the target time-frequency resource in the second mapping sequence; sending, by the network device, the second PBCH on the target time-frequency resource; mapping, by the network device, a third PBCH to a target time-frequency resource in the third mapping sequence; sending, by the network device, the third PBCH on the target time-frequency resource; mapping, by the network device, a fourth PBCH to a target time-frequency resource in the fourth mapping sequence; and sending, by the network device, the fourth PBCH on the target time-frequency resource, where the second mapping sequence, the third mapping sequence, and the fourth mapping sequence each are one of the N mapping sequences, and the first mapping sequence, the second mapping sequence, the third mapping sequence, and the fourth mapping sequence are different from each other.

In a possible design, the first PBCH, the second PBCH, the third PBCH, or the fourth PBCH belongs to a first synchronization signal/physical broadcast channel block SSB, and in time domain, the first SSB occupies four consecutive time-domain symbols that are respectively a first time-domain symbol, a second time-domain symbol, a third time-domain symbol, and a fourth time-domain symbol; and in frequency domain, the first SSB occupies 240 consecutive subcarriers, and numbers of the 240 subcarriers are sequentially 0 to 239; the first time-frequency resource includes subcarriers whose numbers are 48 to 191 in the $2^{nd}$ time-domain symbol in the first SSB; the second time-frequency resource includes subcarriers whose numbers are 48 to 191 in the $4^{th}$ time-domain symbol in the first SSB; the third time-frequency resource includes subcarriers whose numbers are 192 to 239 in the $2^{nd}$ time-domain symbol, the $3^{rd}$ time-domain symbol, and the $4^{th}$ time-domain symbol in the first SSB; and the fourth time-frequency resource includes subcarriers whose numbers are 0 to 47 in the $2^{nd}$ time-domain symbol, the $3^{rd}$ time-domain symbol, and the $4^{th}$ time-domain symbol in the first SSB.

In a possible design, the first SSB further includes a primary synchronization signal PSS and a secondary synchronization signal SSS, the PSS is carried on subcarriers whose numbers are 56 to 182 in the second time-domain symbol, and the SSS is carried on subcarriers whose numbers are 56 to 182 in the third time-domain symbol.

In a possible design, a value of N is a positive integer greater than or equal to 2, the first PBCH includes the first PBCH part to a twelfth PBCH part, and the target time-frequency resource includes the first time-frequency resource to a fourteenth time-frequency domain resource; and the first mapping sequence or the second mapping sequence is either of the following:

the twelfth PBCH part is mapped to the first time-frequency resource, the first PBCH part is mapped to the second time-frequency resource, the second PBCH part is mapped to the third time-frequency resource, the third PBCH part is mapped to the fourth time-frequency resource, the fourth PBCH part is mapped to the fifth time-frequency resource, the eleventh PBCH part is mapped to the sixth time-frequency resource, the fifth PBCH part is mapped to the seventh time-frequency resource, the eleventh PBCH part is mapped to the eighth time-frequency resource, the fifth PBCH part is mapped to the ninth time-frequency resource, the tenth PBCH part is mapped to the tenth time-frequency resource, the ninth PBCH part is mapped to the eleventh time-frequency resource, the eighth PBCH part is mapped to the twelfth time-frequency resource, the seventh PBCH part is mapped to the thirteenth time-frequency resource, and the sixth PBCH part is mapped to the fourteenth time-frequency resource; or the third PBCH part is mapped to the first time-frequency resource, the fourth PBCH part is mapped to the second time-frequency resource, the eleventh PBCH part is mapped to the third time-frequency resource, the twelfth PBCH part is mapped to the fourth time-frequency resource, the first PBCH part is mapped to the fifth time-frequency resource, the eighth PBCH part is mapped to the sixth time-frequency resource, the second PBCH part is mapped to the seventh time-frequency resource, the eighth PBCH part is mapped to the eighth time-frequency resource, the second PBCH part is mapped to the ninth time-frequency resource, the seventh PBCH part is mapped to the tenth time-frequency resource, the sixth PBCH part is mapped to the eleventh time-frequency resource, the fifth PBCH part is mapped to the twelfth time-frequency resource, the tenth PBCH part is mapped to the thirteenth time-frequency resource, and the ninth PBCH part is mapped to the fourteenth time-frequency resource.

According to a fourth aspect, a communication method is provided, and includes: receiving, by a terminal device, a first physical broadcast channel PBCH on a target time-frequency resource, where the first PBCH is mapped to the target time-frequency resource unit in a first mapping sequence, the first mapping sequence is one of N mapping sequences, and N is a positive integer greater than 1; and processing, by the terminal device, the first PBCH.

In a possible design, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, and the second mapping sequence is different from the first mapping sequence; and the first mapping sequence or the second mapping sequence is either of the following: the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; or the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource.

In a possible design, the method further includes: receiving, by the terminal device, a second PBCH on a target time-frequency resource, where the second PBCH is mapped to the target time-frequency resource unit in the second mapping sequence, the second mapping sequence is one of the N mapping sequences, and the second mapping sequence is different from the first mapping sequence.

In a possible design, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, a third mapping sequence, and a fourth mapping sequence, and the first mapping sequence, the second mapping sequence, the third mapping sequence, and the fourth mapping sequence are different from each other; and the first mapping sequence, the second mapping sequence, the third mapping sequence, or the fourth mapping sequence is one of the following:

the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource; the first PBCH part is mapped to the first time-frequency resource, the second PBCH part is mapped to the second time-frequency resource, the third PBCH part is mapped to the fourth time-frequency resource, and the fourth PBCH part is mapped to the third time-frequency resource; or the first PBCH part is mapped to the fourth time-frequency resource, the second PBCH part is mapped to the third time-frequency resource, the third PBCH part is mapped to the first time-frequency resource, and the fourth PBCH part is mapped to the second time-frequency resource.

In a possible design, the method further includes: receiving, by the terminal device, the second PBCH on the target time-frequency resource, where the second PBCH is mapped to the target time-frequency resource unit in the second mapping sequence; receiving, by the terminal device, a third PBCH on a target time-frequency resource, where the third PBCH is mapped to the target time-frequency resource unit in the third mapping sequence; and receiving, by the terminal device, a fourth PBCH on a target time-frequency resource, where the fourth PBCH is mapped to the target time-frequency resource unit in the fourth mapping sequence, the second mapping sequence, the third mapping sequence, and the fourth mapping sequence each are one of the N mapping sequences, and the first mapping sequence, the second mapping sequence, the third mapping sequence, and the fourth mapping sequence are different from each other.

In a possible design, the first PBCH, the second PBCH, the third PBCH, or the fourth PBCH belongs to a first SSB, and in time domain, the first SSB occupies four consecutive time-domain symbols that are respectively a first time-domain symbol, a second time-domain symbol, a third time-domain symbol, and a fourth time-domain symbol; and in frequency domain, the first SSB occupies 240 consecutive subcarriers, and numbers of the 240 subcarriers are sequentially 0 to 239; the first time-frequency resource includes subcarriers whose numbers are 48 to 191 in the $2^{nd}$ time-domain symbol in the first SSB; the second time-frequency resource includes subcarriers whose numbers are 48 to 191 in the $4^{th}$ time-domain symbol in the first SSB; the third time-frequency resource includes subcarriers whose numbers are 192 to 239 in the $2^{nd}$ time-domain symbol, the $3^{rd}$ time-domain symbol, and the $4^{th}$ time-domain symbol in the first SSB; and the fourth time-frequency resource includes subcarriers whose numbers are 0 to 47 in the $2^{nd}$ time-domain symbol, the $3^{rd}$ time-domain symbol, and the $4^{th}$ time-domain symbol in the first SSB.

In a possible design, the first SSB further includes a primary synchronization signal PSS and a secondary synchronization signal SSS, the PSS is carried on subcarriers whose numbers are 56 to 182 in the second time-domain symbol, and the SSS is carried on subcarriers whose numbers are 56 to 182 in the third time-domain symbol.

In a possible design, a value of N is a positive integer greater than or equal to 2, the first PBCH includes the first PBCH part to a twelfth PBCH part, and the target time-frequency resource includes the first time-frequency resource to a fourteenth time domain resource; and the first mapping sequence or the second mapping sequence is either of the following:

the twelfth PBCH part is mapped to the first time-frequency resource, the first PBCH part is mapped to the second time-frequency resource, the second PBCH part is mapped to the third time-frequency resource, the third PBCH part is mapped to the fourth time-frequency resource, the fourth PBCH part is mapped to the fifth time-frequency resource, the eleventh PBCH part is mapped to the sixth time-frequency resource, the fifth PBCH part is mapped to the seventh time-frequency resource, the eleventh PBCH part is mapped to the eighth time-frequency resource, the fifth PBCH part is mapped to the ninth time-frequency resource, the tenth PBCH part is mapped to the tenth time-frequency resource, the ninth PBCH part is mapped to the eleventh time-frequency resource, the eighth PBCH part is mapped to the twelfth time-frequency resource, the seventh PBCH part is mapped to the thirteenth time-frequency resource, and the sixth PBCH part is mapped to the fourteenth time-frequency resource; or the third PBCH part is mapped to the first time-frequency resource, the fourth PBCH part is mapped to the second time-frequency resource, the eleventh PBCH part is mapped to the third time-frequency resource, the twelfth PBCH part is mapped to the fourth time-frequency resource, the first PBCH part is mapped to the fifth time-frequency resource, the eighth PBCH part is mapped to the sixth time-frequency resource, the second PBCH part is mapped to the seventh time-frequency resource, the eighth PBCH part is mapped to the eighth time-frequency resource, the second PBCH part is mapped to the ninth time-frequency resource, the seventh PBCH part is mapped to the tenth time-frequency resource, the sixth PBCH part is mapped to the eleventh time-frequency resource, the fifth PBCH part is mapped to the twelfth time-frequency resource, the tenth PBCH part is mapped to the thirteenth time-frequency resource, and the ninth PBCH part is mapped to the fourteenth time-frequency resource.

According to a fifth aspect, an embodiment of this application provides an apparatus. The apparatus may be a network device, or may be an apparatus in a network device, or is an apparatus that can be used together with a network device. The apparatus may include a processing module and a transceiver module, and the processing module and the transceiver module may perform corresponding functions in any design example in the first aspect. Details are as follows.

The processing module is configured to determine a first signal, where the first signal includes a primary synchronization signal PSS, a secondary synchronization signal SSS, and a first physical broadcast channel PBCH, a frequency domain bandwidth occupied by the PSS, the SSS, and the first PBCH is less than 240 subcarriers, and the PSS, the SSS, and the first PBCH are mapped to different time-domain symbols. The transceiver module is configured to send the first signal.

In a possible design, the first PBCH includes a first PBCH part, a second PBCH part, a third PBCH part, and a fourth PBCH part; and when mapping the PSS, the SSS, and the first PBCH to the different time-domain symbols, the processing module is specifically configured to: map the PSS to a first time-domain symbol, map the first PBCH part to a second time-domain symbol, map the SSS to a third time-domain symbol, map the second PBCH part to a fourth time-domain symbol, map the third PBCH part to a fifth time-domain symbol, and map the fourth PBCH part to a sixth time-domain symbol.

In a possible design, the first time-domain symbol to the fourth time-domain symbol are consecutive time-domain symbols in a first slot, and the fifth time-domain symbol and the sixth time-domain symbol are consecutive or non-consecutive time-domain symbols in the first slot; or the first time-domain symbol to the fourth time-domain symbol are consecutive time-domain symbols in a first slot, the fifth time-domain symbol and the sixth time-domain symbol are consecutive or non-consecutive time-domain symbols in a second slot, and the first slot is different from the second slot.

In a possible design, the transceiver module is further configured to send a second signal, where the second signal includes a second PBCH, the second PBCH includes a fifth PBCH part, a sixth PBCH part, the first PBCH part, and the second PBCH part, the fifth PBCH part and the sixth PBCH part are mapped to the second time-domain symbol, the third time-domain symbol, and the fourth time-domain symbol, and frequency domain resources of the fifth PBCH part and the sixth PBCH part do not overlap frequency domain resources of the first PBCH part, the SSS, and the second PBCH part.

In a possible design, the first PBCH includes a first PBCH part, a second PBCH part, a third PBCH part, and a fourth PBCH part; and when mapping the PSS, the SSS, and the first PBCH to the different time-domain symbols, the processing module is specifically configured to: map the PSS to a first time-domain symbol, map the SSS to a second time-domain symbol, map the first PBCH part to a third time-domain symbol, map the second PBCH part to a fourth time-domain symbol, map the third PBCH part to a fifth time-domain symbol, and map the fourth PBCH part to a sixth time-domain symbol.

In a possible design, the first time-domain symbol and the second time-domain symbol are consecutive or non-consecutive time-domain symbols in a first slot, and the third time-domain symbol to the sixth time-domain symbol are consecutive or non-consecutive time-domain symbols in the first slot; or the first time-domain symbol and the second time-domain symbol are consecutive or non-consecutive time-domain symbols in a first slot, the third time-domain symbol to the sixth time-domain symbol are consecutive or non-consecutive time-domain symbols in a second slot, and the first slot is different from the second slot.

In a possible design, the transceiver module is further configured to send a second signal, where the second signal includes a second PBCH, the second PBCH includes a fifth PBCH part, a sixth PBCH part, a seventh PBCH part, and an eighth PBCH part, the fifth PBCH part is mapped to a seventh time-domain symbol, the sixth PBCH part is mapped to an eighth time-domain symbol, the seventh PBCH part and the eighth PBCH part are mapped to the seventh time-domain symbol, the second time-domain symbol, and the eighth time-domain symbol, and frequency domain resources of the seventh PBCH part and the eighth PBCH part do not overlap frequency domain resources of the fifth PBCH part, the SSS, and the sixth PBCH part.

According to a sixth aspect, an embodiment of this application provides an apparatus. The apparatus may be a terminal device, or may be an apparatus in a terminal device, or is an apparatus that can be used together with a terminal device. The apparatus may include a processing module and a transceiver module, and the processing module and the transceiver module may perform corresponding functions in any design example in the second aspect. Details are as follows.

The transceiver module is configured to receive a first signal, where the first signal includes a primary synchronization signal PSS, a secondary synchronization signal SSS, and a first physical broadcast channel PBCH, a frequency domain bandwidth occupied by the PSS, the SSS, and the first PBCH is less than 240 subcarriers, and the PSS, the SSS, and the first PBCH are mapped to different time-domain symbols. The processing module is configured to process the first signal.

In a possible design, the first PBCH includes a first PBCH part, a second PBCH part, a third PBCH part, and a fourth PBCH part; and that the PSS, the SSS, and the first PBCH are mapped to different time-domain symbols includes: the PSS is mapped to a first time-domain symbol, the first PBCH part is mapped to a second time-domain symbol, the SSS is mapped to a third time-domain symbol, the second PBCH part is mapped to a fourth time-domain symbol, the third PBCH part is mapped to a fifth time-domain symbol, and the fourth PBCH part is mapped to a sixth time-domain symbol.

In a possible design, the first time-domain symbol to the fourth time-domain symbol are consecutive time-domain symbols in a first slot, and the fifth time-domain symbol and the sixth time-domain symbol are consecutive or non-consecutive time-domain symbols in the first slot; or the first time-domain symbol to the fourth time-domain symbol are consecutive time-domain symbols in a first slot, the fifth time-domain symbol and the sixth time-domain symbol are consecutive or non-consecutive time-domain symbols in a second slot, and the first slot is different from the second slot.

In a possible design, the transceiver module is further configured to receive a second signal, where the second signal includes a second PBCH, the second PBCH includes a fifth PBCH part, a sixth PBCH part, the first PBCH part, and the second PBCH part, the fifth PBCH part and the sixth PBCH part are mapped to the second time-domain symbol, the third time-domain symbol, and the fourth time-domain symbol, and frequency domain resources of the fifth PBCH part and the sixth PBCH part do not overlap frequency domain resources of the first PBCH part, the SSS, and the second PBCH part.

In a possible design, the first PBCH includes a first PBCH part, a second PBCH part, a third PBCH part, and a fourth PBCH part; and that the PSS, the SSS, and the first PBCH are mapped to different time-domain symbols includes: the PSS is mapped to a first time-domain symbol, the SSS is mapped to a second time-domain symbol, the first PBCH part is mapped to a third time-domain symbol, the second PBCH part is mapped to a fourth time-domain symbol, the third PBCH part is mapped to a fifth time-domain symbol, and the fourth PBCH part is mapped to a sixth time-domain symbol.

In a possible design, the first time-domain symbol and the second time-domain symbol are consecutive or non-consecutive time-domain symbols in a first slot, and the third time-domain symbol to the sixth time-domain symbol are consecutive or non-consecutive time-domain symbols in the first slot; or the first time-domain symbol and the second time-domain symbol are consecutive or non-consecutive time-domain symbols in a first slot, the third time-domain symbol to the sixth time-domain symbol are consecutive or non-consecutive time-domain symbols in a second slot, and the first slot is different from the second slot.

In a possible design, the transceiver module is further configured to receive a second signal, where the second signal includes a second PBCH, the second PBCH includes a fifth PBCH part, a sixth PBCH part, a seventh PBCH part, and an eighth PBCH part, the fifth PBCH part is mapped to a seventh time-domain symbol, the sixth PBCH part is mapped to an eighth time-domain symbol, the seventh PBCH part and the eighth PBCH part are mapped to the seventh time-domain symbol, the second time-domain symbol, and the eighth time-domain symbol, and frequency domain resources of the seventh PBCH part and the eighth PBCH part do not overlap frequency domain resources of the fifth PBCH part, the SSS, and the sixth PBCH part.

According to a seventh aspect, an embodiment of this application provides an apparatus. The apparatus may be a network device, or may be an apparatus in a network device, or is an apparatus that can be used together with a network device. The apparatus may include a processing module and a transceiver module, and the processing module and the transceiver module may perform corresponding functions in any design example in the third aspect. Details are as follows.

The processing module is configured to map a first physical broadcast channel PBCH to a target time-frequency resource in a first mapping sequence. The transceiver module is configured to send the first PBCH on the target time-frequency resource. The first mapping sequence is one of N mapping sequences, and N is a positive integer greater than 1.

In a possible design, N is a positive integer greater than or equal to 2, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, and the second mapping sequence is different from the first mapping sequence; and the first mapping sequence or the second mapping sequence is either of the following: the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; or the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource.

In a possible design, the processing module is further configured to map a second PBCH to a target time-frequency resource in the second mapping sequence. The transceiver module is further configured to send the second PBCH on the target time-frequency resource. The second mapping sequence is one of the N mapping sequences, and the second mapping sequence is different from the first mapping sequence.

In a possible design, N is a positive integer greater than or equal to 4, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, a third mapping sequence, and a fourth mapping sequence, and the first mapping sequence, the second mapping sequence, the third mapping sequence, and the fourth mapping sequence are different from each other; and the first mapping sequence, the second mapping sequence, the third mapping sequence, or the fourth mapping sequence is one of the following:

the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource; the first PBCH part is mapped to the first time-frequency resource, the second PBCH part is mapped to the second time-frequency resource, the third PBCH part is mapped to the fourth time-frequency resource, and the fourth PBCH part is mapped to the third time-frequency resource; or the first PBCH part is mapped to the fourth time-frequency resource, the second PBCH part is mapped to the third time-frequency resource, the third PBCH part is mapped to the first time-frequency resource, and the fourth PBCH part is mapped to the second time-frequency resource.

In a possible design, the processing module is further configured to map the second PBCH to the target time-frequency resource in the second mapping sequence. The transceiver module is further configured to send the second PBCH on the target time-frequency resource. The processing module is further configured to map a third PBCH to a target time-frequency resource in the third mapping sequence. The transceiver module is further configured to send the third PBCH on the target time-frequency resource. The processing module is further configured to map a fourth PBCH to a target time-frequency resource in the fourth mapping sequence. The transceiver module is further configured to send the fourth PBCH on the target time-frequency resource. The second mapping sequence, the third mapping sequence, and the fourth mapping sequence each are one of the N mapping sequences, and the first mapping sequence, the second mapping sequence, the third mapping sequence, and the fourth mapping sequence are different from each other.

In a possible design, the first PBCH, the second PBCH, the third PBCH, or the fourth PBCH belongs to a first synchronization signal/physical broadcast channel block SSB, and in time domain, the first SSB occupies four consecutive time-domain symbols that are respectively a first time-domain symbol, a second time-domain symbol, a third time-domain symbol, and a fourth time-domain symbol; and in frequency domain, the first SSB occupies 240 consecutive subcarriers, and numbers of the 240 subcarriers are sequentially 0 to 239; the first time-frequency resource includes subcarriers whose numbers are 48 to 191 in the $2^{nd}$ time-domain symbol in the first SSB; the second time-frequency resource includes subcarriers whose numbers are 48 to 191 in the $4^{th}$ time-domain symbol in the first SSB; the third time-frequency resource includes subcarriers whose numbers are 192 to 239 in the $2^{nd}$ time-domain symbol, the $3^{rd}$ time-domain symbol, and the $4^{th}$ time-domain symbol in the first SSB; and the fourth time-frequency resource includes subcarriers whose numbers are 0 to 47 in the $2^{nd}$ time-domain symbol, the $3^{rd}$ time-domain symbol, and the $4^{th}$ time-domain symbol in the first SSB.

In a possible design, the first SSB further includes a primary synchronization signal PSS and a secondary synchronization signal SSS, the PSS is carried on subcarriers whose numbers are 56 to 182 in the second time-domain symbol, and the SSS is carried on subcarriers whose numbers are 56 to 182 in the third time-domain symbol.

According to an eighth aspect, an embodiment of this application provides an apparatus. The apparatus may be a terminal device, or may be an apparatus in a terminal device, or is an apparatus that can be used together with a terminal device. The apparatus may include a processing module and a transceiver module, and the processing module and the transceiver module may perform corresponding functions in any design example in the fourth aspect. Details are as follows.

The transceiver module is configured to receive a first physical broadcast channel PBCH on a target time-frequency resource, where the first PBCH is mapped to the target time-frequency resource unit in a first mapping sequence, the first mapping sequence is one of N mapping sequences, and N is a positive integer greater than 1. The processing module is configured to process the first PBCH.

In a possible design, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, and the second mapping sequence is different from the first mapping sequence; and the first mapping sequence or the second mapping sequence is either of the following: the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; or the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource.

In a possible design, the transceiver module is further configured to receive a second PBCH on a target time-frequency resource, where the second PBCH is mapped to the target time-frequency resource unit in the second mapping sequence, the second mapping sequence is one of the N mapping sequences, and the second mapping sequence is different from the first mapping sequence.

In a possible design, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, a third mapping sequence, and a fourth mapping sequence, and the first mapping sequence, the second mapping sequence, the third mapping sequence, and the fourth mapping sequence are different from each other; and the first mapping sequence, the second mapping sequence, the third mapping sequence, or the fourth mapping sequence is one of the following:

the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource; the first PBCH part is mapped to the first time-frequency resource, the second PBCH part is mapped to the second time-frequency resource, the third PBCH part is mapped to the fourth time-frequency resource, and the fourth PBCH part is mapped to the third time-frequency resource; or the first PBCH part is mapped to the fourth time-frequency resource, the second PBCH part is mapped to the third time-frequency resource, the third PBCH part is mapped to the first time-frequency resource, and the fourth PBCH part is mapped to the second time-frequency resource.

In a possible design, the transceiver module is further configured to receive the second PBCH on the target time-frequency resource, where the second PBCH is mapped to the target time-frequency resource unit in the second mapping sequence. The transceiver module is further configured to receive a third PBCH on a target time-frequency resource, where the third PBCH is mapped to the target time-frequency resource unit in the third mapping sequence. The transceiver module is further configured to receive a fourth PBCH on a target time-frequency resource, where the fourth PBCH is mapped to the target time-frequency resource unit in the fourth mapping sequence, the second mapping sequence, the third mapping sequence, and the fourth mapping sequence each are one of the N mapping sequences, and the first mapping sequence, the second mapping sequence, the third mapping sequence, and the fourth mapping sequence are different from each other.

In a possible design, the first PBCH, the second PBCH, the third PBCH, or the fourth PBCH belongs to a first SSB, and in time domain, the first SSB occupies four consecutive time-domain symbols that are respectively a first time-domain symbol, a second time-domain symbol, a third time-domain symbol, and a fourth time-domain symbol; and in frequency domain, the first SSB occupies 240 consecutive subcarriers, and numbers of the 240 subcarriers are sequentially 0 to 239; the first time-frequency resource includes subcarriers whose numbers are 48 to 191 in the $2^{nd}$ time-domain symbol in the first SSB; the second time-frequency resource includes subcarriers whose numbers are 48 to 191 in the $4^{th}$ time-domain symbol in the first SSB; the third time-frequency resource includes subcarriers whose numbers are 192 to 239 in the $2^{nd}$ time-domain symbol, the $3^{rd}$ time-domain symbol, and the $4^{th}$ time-domain symbol in the first SSB; and the fourth time-frequency resource includes subcarriers whose numbers are 0 to 47 in the $2^{nd}$ time-domain symbol, the $3^{rd}$ time-domain symbol, and the $4^{th}$ time-domain symbol in the first SSB.

In a possible design, the first SSB further includes a primary synchronization signal PSS and a secondary synchronization signal SSS, the PSS is carried on subcarriers whose numbers are 56 to 182 in the second time-domain symbol, and the SSS is carried on subcarriers whose numbers are 56 to 182 in the third time-domain symbol.

According to a ninth aspect, an embodiment of this application provides an apparatus. The apparatus includes a processor, configured to implement the method described in the first aspect. The apparatus may further include a memory, configured to store instructions and data. The memory is coupled to the processor. When executing the program instructions stored in the memory, the processor can implement the method described in the first aspect. The apparatus may further include a communication interface. The communication interface is used by the apparatus to communicate with another device. For example, the communication interface may be a transceiver, a circuit, a bus, a module, or a communication interface of another type. The another device may be a terminal device or the like. In a possible device, the apparatus includes:

the memory, configured to store the program instructions;

the processor, configured to determine a first signal, where the first signal includes a primary synchronization signal PSS, a secondary synchronization signal SSS, and a first physical broadcast channel PBCH, a frequency domain bandwidth occupied by the PSS, the SSS, and the first PBCH is less than 240 subcarriers, and the PSS, the SSS, and the first PBCH are mapped to different time-domain symbols; and the communication interface, configured to send the first signal.

In a possible design, the first PBCH includes a first PBCH part, a second PBCH part, a third PBCH part, and a fourth PBCH part; and when mapping the PSS, the SSS, and the first PBCH to the different time-domain symbols, the processor is specifically configured to: map the PSS to a first time-domain symbol, map the first PBCH part to a second time-domain symbol, map the SSS to a third time-domain symbol, map the second PBCH part to a fourth time-domain symbol, map the third PBCH part to a fifth time-domain symbol, and map the fourth PBCH part to a sixth time-domain symbol.

In a possible design, the first time-domain symbol to the fourth time-domain symbol are consecutive time-domain symbols in a first slot, and the fifth time-domain symbol and the sixth time-domain symbol are consecutive or non-consecutive time-domain symbols in the first slot; or the first time-domain symbol to the fourth time-domain symbol are consecutive time-domain symbols in a first slot, the fifth time-domain symbol and the sixth time-domain symbol are consecutive or non-consecutive time-domain symbols in a second slot, and the first slot is different from the second slot.

In a possible design, the communication interface is further configured to send a second signal, where the second signal includes a second PBCH, the second PBCH includes a fifth PBCH part, a sixth PBCH part, the first PBCH part, and the second PBCH part, the fifth PBCH part and the sixth PBCH part are mapped to the second time-domain symbol, the third time-domain symbol, and the fourth time-domain symbol, and frequency domain resources of the fifth PBCH part and the sixth PBCH part do not overlap frequency domain resources of the first PBCH part, the SSS, and the second PBCH part.

In a possible design, the first PBCH includes a first PBCH part, a second PBCH part, a third PBCH part, and a fourth PBCH part; and when mapping the PSS, the SSS, and the first PBCH to the different time-domain symbols, the processor is specifically configured to: map the PSS to a first time-domain symbol, map the SSS to a second time-domain symbol, map the first PBCH part to a third time-domain symbol, map the second PBCH part to a fourth time-domain symbol, map the third PBCH part to a fifth time-domain symbol, and map the fourth PBCH part to a sixth time-domain symbol.

In a possible design, the first time-domain symbol and the second time-domain symbol are consecutive or non-consecutive time-domain symbols in a first slot, and the third time-domain symbol to the sixth time-domain symbol are consecutive or non-consecutive time-domain symbols in the first slot; or the first time-domain symbol and the second time-domain symbol are consecutive or non-consecutive time-domain symbols in a first slot, the third time-domain symbol to the sixth time-domain symbol are consecutive or non-consecutive time-domain symbols in a second slot, and the first slot is different from the second slot.

In a possible design, the communication interface is further configured to send a second signal, where the second signal includes a second PBCH, the second PBCH includes a fifth PBCH part, a sixth PBCH part, a seventh PBCH part, and an eighth PBCH part, the fifth PBCH part is mapped to a seventh time-domain symbol, the sixth PBCH part is mapped to an eighth time-domain symbol, the seventh PBCH part and the eighth PBCH part are mapped to the seventh time-domain symbol, the second time-domain symbol, and the eighth time-domain symbol, and frequency domain resources of the seventh PBCH part and the eighth PBCH part do not overlap frequency domain resources of the fifth PBCH part, the SSS, and the sixth PBCH part.

According to a tenth aspect, an embodiment of this application provides an apparatus. The apparatus includes a processor, configured to implement the method described in the second aspect. The apparatus may further include a memory, configured to store instructions and data. The memory is coupled to the processor. When executing the program instructions stored in the memory, the processor can implement the method described in the second aspect. The apparatus may further include a communication interface. The communication interface is used by the apparatus to communicate with another device. For example, the communication interface may be a transceiver, a circuit, a bus, a module, or a communication interface of another type. The another device may be a network device or the like. In a possible device, the apparatus includes:

the memory, configured to store the program instructions;
the communication interface, configured to receive a first signal, where the first signal includes a primary synchronization signal PSS, a secondary synchronization signal SSS, and a first physical broadcast channel PBCH, a frequency domain bandwidth occupied by the PSS, the SSS, and the first PBCH is less than 240 subcarriers, and the PSS, the SSS, and the first PBCH are mapped to different time-domain symbols; and
the processor, configured to process the first signal.

In a possible design, the first PBCH includes a first PBCH part, a second PBCH part, a third PBCH part, and a fourth PBCH part; and that the PSS, the SSS, and the first PBCH are mapped to different time-domain symbols includes: the PSS is mapped to a first time-domain symbol, the first PBCH part is mapped to a second time-domain symbol, the SSS is mapped to a third time-domain symbol, the second PBCH part is mapped to a fourth time-domain symbol, the third PBCH part is mapped to a fifth time-domain symbol, and the fourth PBCH part is mapped to a sixth time-domain symbol.

In a possible design, the first time-domain symbol to the fourth time-domain symbol are consecutive time-domain symbols in a first slot, and the fifth time-domain symbol and the sixth time-domain symbol are consecutive or non-consecutive time-domain symbols in the first slot; or the first time-domain symbol to the fourth time-domain symbol are consecutive time-domain symbols in a first slot, the fifth time-domain symbol and the sixth time-domain symbol are consecutive or non-consecutive time-domain symbols in a second slot, and the first slot is different from the second slot.

In a possible design, the communication interface is further configured to receive a second signal, where the second signal includes a second PBCH, the second PBCH includes a fifth PBCH part, a sixth PBCH part, the first PBCH part, and the second PBCH part, the fifth PBCH part and the sixth PBCH part are mapped to the second time-domain symbol, the third time-domain symbol, and the fourth time-domain symbol, and frequency domain resources of the fifth PBCH part and the sixth PBCH part do not overlap frequency domain resources of the first PBCH part, the SSS, and the second PBCH part.

In a possible design, the first PBCH includes a first PBCH part, a second PBCH part, a third PBCH part, and a fourth PBCH part; and
that the PSS, the SSS, and the first PBCH are mapped to different time-domain symbols includes: the PSS is mapped to a first time-domain symbol, the SSS is mapped to a second time-domain symbol, the first PBCH part is mapped to a third time-domain symbol, the second PBCH part is mapped to a fourth time-domain symbol, the third PBCH part is mapped to a fifth time-domain symbol, and the fourth PBCH part is mapped to a sixth time-domain symbol.

In a possible design, the first time-domain symbol and the second time-domain symbol are consecutive or non-consecutive time-domain symbols in a first slot, and the third time-domain symbol to the sixth time-domain symbol are consecutive or non-consecutive time-domain symbols in the first slot; or the first time-domain symbol and the second time-domain symbol are consecutive or non-consecutive time-domain symbols in a first slot, the third time-domain symbol to the sixth time-domain symbol are consecutive or non-consecutive time-domain symbols in a second slot, and the first slot is different from the second slot.

In a possible design, the communication interface is further configured to receive a second signal, where
the second signal includes a second PBCH, the second PBCH includes a fifth PBCH part, a sixth PBCH part, a seventh PBCH part, and an eighth PBCH part, the fifth PBCH part is mapped to a seventh time-domain symbol, the sixth PBCH part is mapped to an eighth time-domain symbol, the seventh PBCH part and the eighth PBCH part are mapped to the seventh time-domain symbol, the second time-domain symbol, and the eighth time-domain symbol, and frequency domain resources of the seventh PBCH part and the eighth PBCH part do not overlap frequency domain resources of the fifth PBCH part, the SSS, and the sixth PBCH part.

According to an eleventh aspect, an embodiment of this application provides an apparatus. The apparatus includes a processor, configured to implement the method described in the third aspect. The apparatus may further include a memory, configured to store instructions and data. The memory is coupled to the processor. When executing the program instructions stored in the memory, the processor can implement the method described in the third aspect. The apparatus may further include a communication interface. The communication interface is used by the apparatus to communicate with another device. For example, the communication interface may be a transceiver, a circuit, a bus, a module, or a communication interface of another type. The another device may be a terminal device or the like. In a possible device, the apparatus includes:

the memory, configured to store the program instructions;

the processor, configured to map a first physical broadcast channel PBCH to a target time-frequency resource in a first mapping sequence; and the communication interface, configured to send the first PBCH on the target time-frequency resource. The first mapping sequence is one of N mapping sequences, and N is a positive integer greater than 1.

In a possible design, N is a positive integer greater than or equal to 2, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, and the second mapping sequence is different from the first mapping sequence; and the first mapping sequence or the second mapping sequence is either of the following: the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; or the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource.

In a possible design, the processor is further configured to map a second PBCH to a target time-frequency resource in the second mapping sequence. The communication interface is further configured to send the second PBCH on the target time-frequency resource. The second mapping sequence is one of the N mapping sequences, and the second mapping sequence is different from the first mapping sequence.

In a possible design, N is a positive integer greater than or equal to 4, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, a third mapping sequence, and a fourth mapping sequence, and the first mapping sequence, the second mapping sequence, the third mapping sequence, and the fourth mapping sequence are different from each other; and the first mapping sequence, the second mapping sequence, the third mapping sequence, or the fourth mapping sequence is one of the following:

the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource; the first PBCH part is mapped to the first time-frequency resource, the second PBCH part is mapped to the second time-frequency resource, the third PBCH part is mapped to the fourth time-frequency resource, and the fourth PBCH part is mapped to the third time-frequency resource; or the first PBCH part is mapped to the fourth time-frequency resource, the second PBCH part is mapped to the third time-frequency resource, the third PBCH part is mapped to the first time-frequency resource, and the fourth PBCH part is mapped to the second time-frequency resource. In a possible design, the processing module is further configured to map the second PBCH to the target time-frequency resource in the second mapping sequence. The communication interface is further configured to send the second PBCH on the target time-frequency resource. The processor is further configured to map a third PBCH to a target time-frequency resource in the third mapping sequence. The communication interface is further configured to send the third PBCH on the target time-frequency resource. The processor is further configured to map a fourth PBCH to a target time-frequency resource in the fourth mapping sequence. The communication interface is further configured to send the fourth PBCH on the target time-frequency resource. The second mapping sequence, the third mapping sequence, and the fourth mapping sequence each are one of the N mapping sequences, and the first mapping sequence, the second mapping sequence, the third mapping sequence, and the fourth mapping sequence are different from each other.

In a possible design, the first PBCH, the second PBCH, the third PBCH, or the fourth PBCH belongs to a first synchronization signal/physical broadcast channel block SSB, and in time domain, the first SSB occupies four consecutive time-domain symbols that are respectively a first time-domain symbol, a second time-domain symbol, a third time-domain symbol, and a fourth time-domain symbol; and in frequency domain, the first SSB occupies 240 consecutive subcarriers, and numbers of the 240 subcarriers are sequentially 0 to 239; the first time-frequency resource includes subcarriers whose numbers are 48 to 191 in the $2^{nd}$ time-domain symbol in the first SSB; the second time-frequency resource includes subcarriers whose numbers are 48 to 191 in the $4^{th}$ time-domain symbol in the first SSB; the third time-frequency resource includes subcarriers whose numbers are 192 to 239 in the $2^{nd}$ time-domain symbol, the $3^{rd}$ time-domain symbol, and the $4^{th}$ time-domain symbol in the first SSB; and the fourth time-frequency resource includes subcarriers whose numbers are 0 to 47 in the $2^{nd}$ time-domain symbol, the $3^{rd}$ time-domain symbol, and the $4^{th}$ time-domain symbol in the first SSB.

In a possible design, the first SSB further includes a primary synchronization signal PSS and a secondary synchronization signal SSS, the PSS is carried on subcarriers whose numbers are 56 to 182 in the second time-domain symbol, and the SSS is carried on subcarriers whose numbers are 56 to 182 in the third time-domain symbol.

According to a twelfth aspect, an embodiment of this application provides an apparatus. The apparatus includes a processor, configured to implement the method described in the fourth aspect. The apparatus may further include a memory, configured to store instructions and data. The memory is coupled to the processor. When executing the program instructions stored in the memory, the processor can implement the method described in the fourth aspect. The apparatus may further include a communication interface. The communication interface is used by the apparatus to communicate with another device. For example, the communication interface may be a transceiver, a circuit, a bus, a module, or a communication interface of another type.

The another device may be a network device or the like. In a possible device, the apparatus includes:

the memory, configured to store the program instructions;

the communication interface, configured to receive a first physical broadcast channel PBCH on a target time-frequency resource, where the first PBCH is mapped to the target time-frequency resource unit in a first mapping sequence, the first mapping sequence is one of N mapping sequences, and N is a positive integer greater than 1; and the processor, configured to process the first PBCH.

In a possible design, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, and the second mapping sequence is different from the first mapping sequence; and the first mapping sequence or the second mapping sequence is either of the following: the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; or the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource.

In a possible design, the communication interface is further configured to receive a second PBCH on a target time-frequency resource, where the second PBCH is mapped to the target time-frequency resource unit in the second mapping sequence, the second mapping sequence is one of the N mapping sequences, and the second mapping sequence is different from the first mapping sequence.

In a possible design, the first PBCH includes a first PBCH part, a second PBCH part, a third PBCH part, and a fourth PBCH part, and the target time-frequency resource includes a first time-frequency resource, a second time-frequency resource, a third time-frequency resource, and a fourth time-frequency resource; and the N mapping sequences further include a second mapping sequence, a third mapping sequence, and a fourth mapping sequence, and the first mapping sequence, the second mapping sequence, the third mapping sequence, and the fourth mapping sequence are different from each other; and the first mapping sequence, the second mapping sequence, the third mapping sequence, or the fourth mapping sequence is one of the following:

the first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource; the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource; the first PBCH part is mapped to the first time-frequency resource, the second PBCH part is mapped to the second time-frequency resource, the third PBCH part is mapped to the fourth time-frequency resource, and the fourth PBCH part is mapped to the third time-frequency resource; or the first PBCH part is mapped to the fourth time-frequency resource, the second PBCH part is mapped to the third time-frequency resource, the third PBCH part is mapped to the first time-frequency resource, and the fourth PBCH part is mapped to the second time-frequency resource.

In a possible design, the communication interface is further configured to receive the second PBCH on the target time-frequency resource, where the second PBCH is mapped to the target time-frequency resource unit in the second mapping sequence. The communication interface is further configured to receive a third PBCH on a target time-frequency resource, where the third PBCH is mapped to the target time-frequency resource unit in the third mapping sequence. The communication interface is further configured to receive a fourth PBCH on a target time-frequency resource, where the fourth PBCH is mapped to the target time-frequency resource unit in the fourth mapping sequence, the second mapping sequence, the third mapping sequence, and the fourth mapping sequence each are one of the N mapping sequences, and the first mapping sequence, the second mapping sequence, the third mapping sequence, and the fourth mapping sequence are different from each other.

In a possible design, the first PBCH, the second PBCH, the third PBCH, or the fourth PBCH belongs to a first SSB, and in time domain, the first SSB occupies four consecutive time-domain symbols that are respectively a first time-domain symbol, a second time-domain symbol, a third time-domain symbol, and a fourth time-domain symbol; and in frequency domain, the first SSB occupies 240 consecutive subcarriers, and numbers of the 240 subcarriers are sequentially 0 to 239; the first time-frequency resource includes subcarriers whose numbers are 48 to 191 in the $2^{nd}$ time-domain symbol in the first SSB; the second time-frequency resource includes subcarriers whose numbers are 48 to 191 in the $4^{th}$ time-domain symbol in the first SSB; the third time-frequency resource includes subcarriers whose numbers are 192 to 239 in the $2^{nd}$ time-domain symbol, the $3^{rd}$ time-domain symbol, and the $4^{th}$ time-domain symbol in the first SSB; and the fourth time-frequency resource includes subcarriers whose numbers are 0 to 47 in the $2^{nd}$ time-domain symbol, the $3^{rd}$ time-domain symbol, and the $4^{th}$ time-domain symbol in the first SSB.

In a possible design, the first SSB further includes a primary synchronization signal PSS and a secondary synchronization signal SSS, the PSS is carried on subcarriers whose numbers are 56 to 182 in the second time-domain symbol, and the SSS is carried on subcarriers whose numbers are 56 to 182 in the third time-domain symbol.

According to a thirteenth aspect, an embodiment of this application further provides a computer-readable storage medium, including instructions. When the instructions are run on a computer, the computer is enabled to perform the method according to a design in any one of the first aspect to the fourth aspect.

According to a fourteenth aspect, an embodiment of this application further provides a chip system. The chip system includes a processor, and may further include a memory, and is configured to implement the method according to a possible design in any one of the first aspect to the fourth aspect. The chip system may include a chip, or may include a chip and another discrete component.

According to a fifteenth aspect, an embodiment of this application further provides a computer program product, including instructions. When the instructions are run on a computer, the computer is enabled to perform the method according to a possible design in any one of the first aspect to the fourth aspect.

According to a sixteenth aspect, an embodiment of this application provides a system. The system includes the network device and the terminal device according to any one of the foregoing aspects.

BRIEF DESCRIPTION OF DRAWINGS

FIG. 4a is a schematic diagram of an SSB design according to an embodiment of this application;

DESCRIPTION OF EMBODIMENTS

The following describes the technical solutions in the embodiments of this application with reference to the accompanying drawings in the embodiments of this application.

Figure 1:
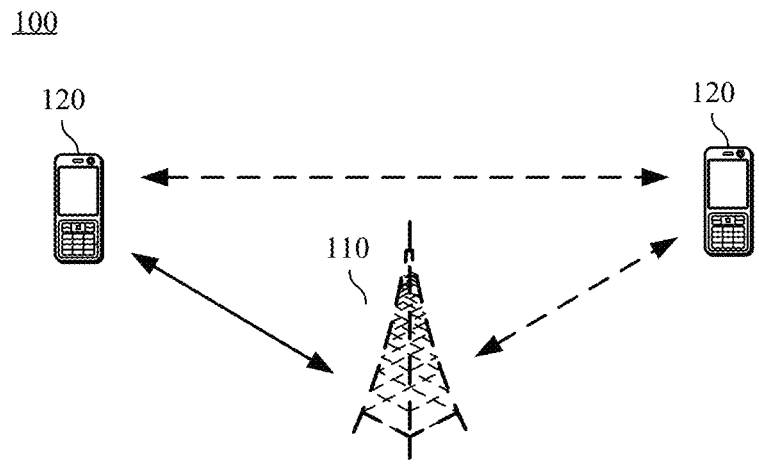
FIG. 1 is a schematic diagram of a communication system according to an embodiment of this application.

FIG. 1 shows a communication system 100 to which an embodiment of this application is applied. The communication system 100 may include at least one network device 110. The network device 110 may be a device, for example, a base station or a base station controller, that communicates with a terminal device. Each network device 110 may provide communication coverage for a specific geographical area, and may communicate with a terminal device located in the coverage area (a cell). The network device 110 may be a base transceiver station (base transceiver station, BTS) in a global system for mobile communication (global system for mobile communications, GSM) system or code division multiple access (code division multiple access, CDMA), a NodeB (NodeB, NB) in a wideband code division multiple access (wideband code division multiple access, WCDMA) system, an evolved NodeB (evolved NodeB, eNB or eNodeB) in an LTE system, or a radio controller in a cloud radio access network (cloud radio access network, CRAN) scenario. Alternatively, the network device may be a relay station, an access point, a vehicle-mounted device, a wearable device, or a network device in a future 5G network, for example, a gNodeB (gNodeB or gNB) or a transmission reception point (transmission receiving point/transmission reception point, TRP) in new radio (new radio, NR). Alternatively, the network device 110 may be a network device in a future evolved public land mobile network (public land mobile network, PLMN) network, or the like. This is not limited in this embodiment of this application.

The communication system 100 further includes one or more terminal devices 120 within coverage of the network device 110. The terminal device 120 may be mobile or fixed. The terminal device 120 may refer to an access terminal, user equipment (user equipment, UE), a subscriber unit, a subscriber station, a mobile station, a mobile station, a remote station, a remote terminal, a mobile device, a user terminal, a terminal, a wireless communication device, a user agent, or a user apparatus. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in the future 5G network, a terminal device in the future evolved public land mobile network (public land mobile network, PLMN), or the like. This is not limited in this embodiment of this application.

FIG. 1 shows one network device and two terminal devices as an example. Optionally, the communication system 100 may include a plurality of network devices, and another quantity of terminal devices may be included in coverage of one network device. This is not limited in this embodiment of this application.

In an example, the network device 110 may send a synchronization signal/physical broadcast channel block (synchronization signal/physical broadcast channel block, SS/PBCH Block, SSB) to the terminal device 120, and the SSB includes a primary synchronization signal (primary synchronization signal, PSS), a secondary synchronization signal (secondary synchronization signal, SSS), and a physical broadcast channel (physical broadcast channel, PBCH). After receiving the SSB, the terminal device 120 may parse the SSB to obtain the PSS, the SSS, and the PBCH in the SSB. The terminal device 120 may keep synchronous with the network device 110 based on the PSS and the SSS, and the terminal device 120 may obtain a broadcast message based on the PBCH.

Figure 2:
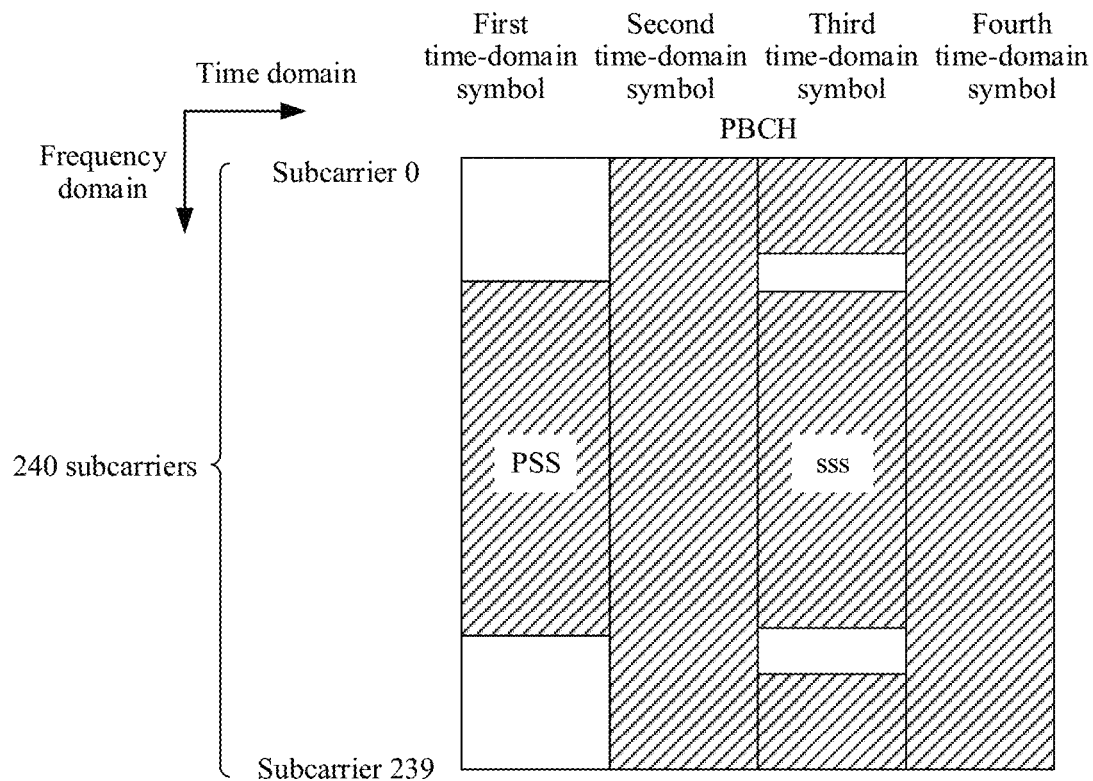
FIG. 2 is a schematic diagram of an SSB design according to an embodiment of this application.

In an example, as shown in FIG. 2, in frequency domain, the SSB may occupy 240 subcarriers, and numbers (or indexes) of the 240 subcarriers are sequentially 0 to 239. In time domain, the SSB occupies four time-domain symbols, and numbers (or indexes) of the four time-domain symbols are sequentially a first time-domain symbol, a second time-domain symbol, a third time-domain symbol, and a fourth time-domain symbol.

Still referring to FIG. 2, subcarriers whose numbers are 56 to 182 in the $1^{st}$ time-domain symbol from left to right are used to carry the PSS, and subcarriers whose numbers are 0 to 55 and 183 to 239 in the $1^{st}$ time-domain symbol from left to right are set to 0. The $2^{nd}$ time-domain symbol from left to right is used to carry the PBCH. The $3^{rd}$ time-domain symbol from left to right is used to carry the SSS and the PBCH. For example, subcarriers whose numbers are from 0 to 47 and 192 to 239 in the $3^{rd}$ time-domain symbol from left to right are used to carry the PBCH, and subcarriers whose numbers are 56 to 182 in the $3^{rd}$ time-domain symbol from left to right are used to carry the SSS. The $4^{th}$ time-domain symbol from left to right is used to carry the PBCH. Optionally, for subcarriers carrying the PBCH, one of every four consecutive subcarriers may be used to carry a demodulation reference signal (demodulation reference signal, DMRS) corresponding to the PBCH.

It can be learned that, for an SSB configuration shown in FIG. 2, the 240 subcarriers are occupied in frequency domain. In other words, for the SSB configuration shown in FIG. 2, a terminal device needs to support a frequency domain bandwidth of at least 240 subcarriers. Therefore, for a terminal device that supports a frequency domain bandwidth less than 240 subcarriers, how to configure the SSB is a technical problem to be resolved in this application. Optionally, in the embodiments of this application, the terminal device whose frequency domain bandwidth is greater than or equal to 240 subcarriers may also be referred to as a broadband terminal device, and the terminal device whose frequency domain bandwidth is less than 240 subcarriers may also be referred to as a narrowband terminal device. Optionally, for a communication system in which one resource block occupies 12 subcarriers, 240 subcarriers may also be referred to as 20 RBs.

The following explains and describes some communication nouns or terms used in this application. The communication nouns or terms are also used as a part of the summary of the embodiments of this application.

1. Resource Block (Resource Block, RB)

N consecutive subcarriers in frequency domain may be referred to as one resource block. For example, one resource block may include 12 subcarriers. With evolution of a system, one resource block may alternatively include another quantity of subcarriers. This is not limited in this application. For example, in the embodiments of this application, for a communication system in which one resource block includes 12 subcarriers, 240 subcarriers may also be referred to as 20 RBs.

2. Subcarrier

In a wireless communication system, a frequency domain resource may be divided into several subresources, and each subresource in frequency domain may be referred to as a subcarrier. Alternatively, a subcarrier may also be referred to as a minimum granularity of the frequency domain resource.

3. Time-Domain Symbol

In the wireless communication system, a time-domain symbol is a minimum time unit in time domain. The time-domain symbol may be referred to as a symbol for short. The time-domain symbol may be an orthogonal frequency division multiplexing (orthogonal frequency division multiplexing, OFDM) symbol, or may be a discrete fourier transform spread orthogonal frequency division multiplexing (discrete fourier transform spread orthogonal frequency division multiplexing, DFT-s-OFDM) symbol or the like.

4. Slot

There may be different slot lengths for different subcarrier spacings. For example, when a subcarrier spacing is 15 kHz, a slot may be 1 millisecond (ms). When a subcarrier spacing is 30 kHz, a slot may be 0.5 milliseconds (ms). One slot may include one or more symbols. For example, in a case of a normal cyclic prefix (cyclic prefix, CP), one slot may include 14 time-domain symbols, and in a case of an extended CP, one slot may include 12 time-domain symbols.

5. Time-Frequency Resource

Figure 12:
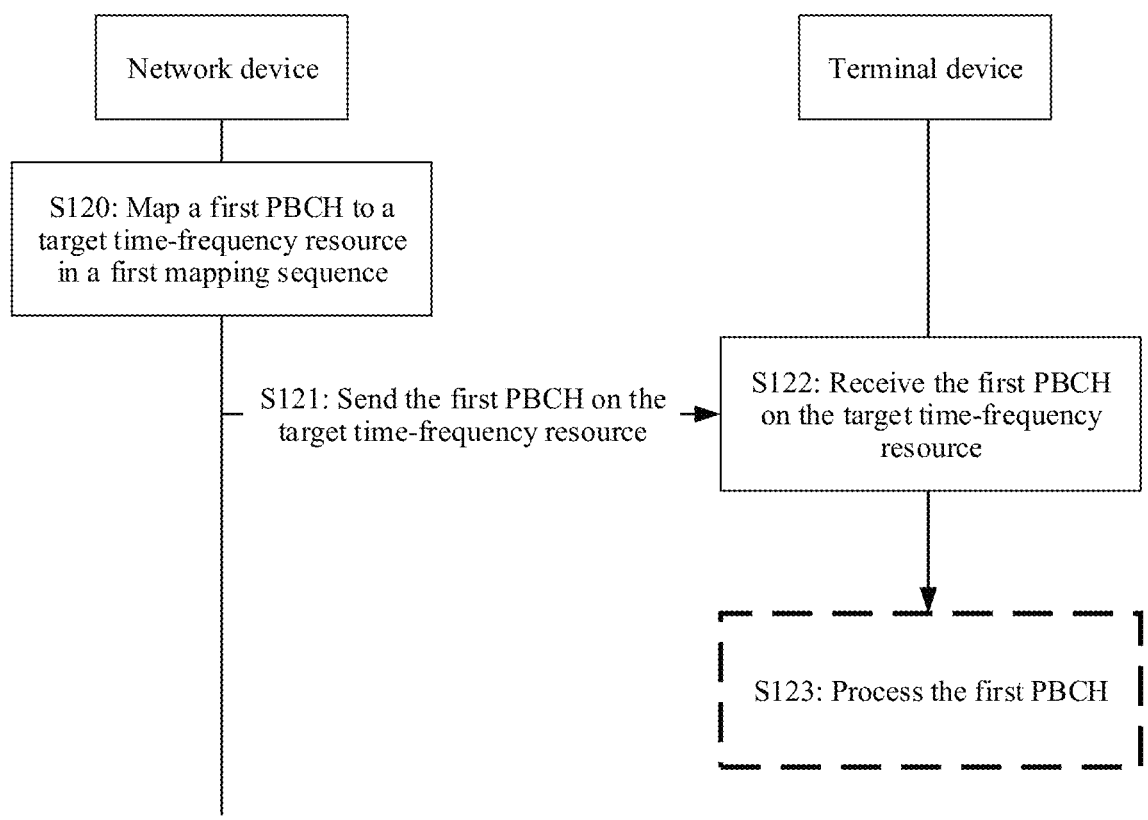
FIG. 12 is a schematic diagram of a procedure of a communication method according to an embodiment of this application.

A time-frequency resource used to transmit a PBCH is divided into a plurality of parts, and each part is referred to as a slot resource. For example, in FIG. 8, a time-frequency resource used to transmit a PBCH may be divided into four parts that are respectively a first time-frequency resource, a second time-frequency resource, a third time-frequency resource, and a fourth time-frequency resource. For example, as shown in FIG. 12, a time-frequency resource that may be used to transmit a PBCH is divided into 14 parts that are respectively a first time-frequency resource, a second time-frequency resource, and the like, until a fourteenth time-frequency resource. It should be noted that, sizes of all time-frequency resources may be the same or may be different. This is not limited herein.

In addition, it should be understood that, in the descriptions of this application, terms such as "first" and "second" are merely used for distinction and description, but cannot be understood as an indication or implication of relative importance, and cannot be understood as an indication or implication of a sequence.

Figure 3:
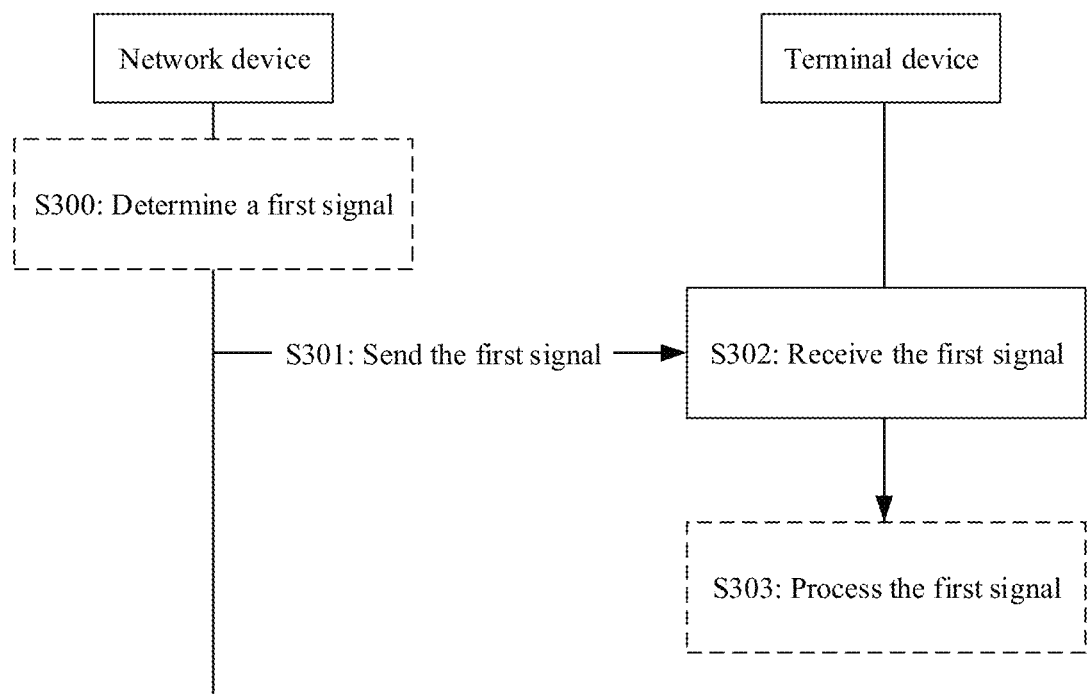
FIG. 3 is a schematic diagram of a procedure of a communication method according to an embodiment of this application.

As shown in FIG. 3, a procedure of a communication method is provided. A network device in the procedure may be the network device 110 in FIG. 1, and a terminal device may be the terminal device 120 in FIG. 1. It may be understood that, a function of the network device may also be implemented by using a chip used in the network device, or another apparatus is used to support the network device in implementing the function of the network device. A function of the terminal device may also be implemented by using a chip used in the terminal device, or another apparatus is used to support the terminal device in implementing the function of the terminal device. The procedure includes the following steps.

S301: The network device sends a first signal, where the first signal includes a PSS, an SSS, and a first PBCH, a frequency domain bandwidth occupied by the PSS, the SSS, and the first PBCH is less than 240 subcarriers, and the PSS, the SSS, and the first PBCH are mapped to different time-domain symbols. For example, the PSS, the SSS, and the first PBCH may be mapped to six different time-domain symbols. The first signal may also be referred to as an SSB.

S302: The terminal device receives the first signal.

Optionally, the procedure shown in FIG. 3 may further include S300: The network device determines the first signal.

Optionally, the procedure shown in FIG. 3 may further include S303: The terminal device processes the first signal. In an example, the terminal device may parse the first signal to obtain the primary synchronization signal PSS, the secondary synchronization signal SSS, and the physical broadcast channel PBCH. The terminal device may keep synchronous with the network device based on the PSS and the SSS. The terminal device may receive a broadcast message and the like based on the PBCH.

It can be learned from the foregoing that, in this embodiment of this application, the first signal includes the PSS, the SSS, and the first PBCH. The frequency domain bandwidth occupied by the PSS, the SSS, and the first PBCH is less than 240 subcarriers. It can be learned that, the first signal can be used by a terminal device whose frequency domain bandwidth is less than 240 subcarriers, that is, used by a narrowband terminal device.

Example 1

In this embodiment of this application, a frequency domain bandwidth occupied by the first signal is less than 240 subcarriers. For example, the frequency domain bandwidth occupied by the first signal may be 144 subcarriers. For a communication system in which one resource block RB includes 12 subcarriers, the 144 subcarriers may also be referred to as 12 resource blocks RBs. The first signal may occupy six time-domain symbols. The six time-domain symbols may be respectively a first time-domain symbol, a second time-domain symbol, a third time-domain symbol, a fourth time-domain symbol, a fifth time-domain symbol, and a sixth time-domain symbol.

In an example, the first signal includes the PSS, the SSS, and the first PBCH. The first PBCH may include a first PBCH part, a second PBCH part, a third PBCH part, and a fourth PBCH part. A process in which the PSS, the SSS, and the first PBCH are mapped to the different time-domain symbols may be as follows: The PSS is mapped to the first time-domain symbol, the first PBCH part may be mapped to the second time-domain symbol, the SSS may be mapped to the third time-domain symbol, the second PBCH part may be mapped to the fourth time-domain symbol, a third PBCH part may be mapped to the fifth time-domain symbol, and a fourth PBCH part may be mapped to the sixth time-domain symbol.

It may be understood that, in this embodiment of this application, that X1 is mapped to an X2$^{th}$ time-domain symbol may also mean that X1 is carried on the X2$^{th}$ time-domain symbol. For example, X1 may be the PSS, the SSS, the PBCH, the first PBCH part, the second PBCH part, the third PBCH part, the fourth PBCH part, and the like. The X2$^{th}$ time-domain symbol may be the first time-domain symbol, the second time-domain symbol, the third time-domain symbol, the fourth time-domain symbol, and the like. For example, that the PSS is mapped to the first time-domain symbol may also mean that the PSS is carried on the first time-domain symbol, that the first PBCH part is mapped to the second time-domain symbol may also mean that the first PBCH part is carried on the second time-domain symbol, and that the SSS is mapped to the third time-domain symbol may also mean that the SSS is carried on the third time-domain symbol.

In this embodiment of this application, the first time-domain symbol to the sixth time-domain symbol may be located in a same slot, or may be located in different slots. The first time-domain symbol to the sixth time-domain symbol may be consecutive time-domain symbols or non-consecutive time-domain symbols.

For example, the first time-domain symbol to the fourth time-domain symbol may be consecutive time-domain symbols in a first slot, the fifth time-domain symbol and the sixth time-domain symbol are located in the first slot, and the fifth time-domain symbol and the sixth time-domain symbol are consecutive time-domain symbols in the first slot. For example, as shown in FIG. 4a, in the first slot, the first time-domain symbol to the sixth time-domain symbol are sorted in a time domain sequence, and may be respectively the first time-domain symbol, the second time-domain symbol, the third time-domain symbol, the fourth time-domain symbol, the fifth time-domain symbol, and the sixth time-domain symbol. In addition, the first time-domain symbol is adjacent to the second time-domain symbol, the second time-domain symbol is adjacent to the third time-domain symbol, the third time-domain symbol is adjacent to the fourth time-domain symbol, the fourth time-domain symbol is adjacent to the fifth time-domain symbol, and the fifth time-domain symbol is adjacent to the sixth time-domain symbol. In addition, the first time-domain symbol is used to carry the PSS, the second time-domain symbol is used to carry the first PBCH part, the third time-domain symbol is used to carry the SSS, the fourth time-domain symbol is used to carry the second PBCH part, the fifth time-domain symbol is used to carry the third PBCH part, and the sixth time-domain symbol is used to carry the fourth PBCH part. It may be understood that, in this embodiment of this application, the "first slot" is only used to distinguish from a subsequent "second slot", and the first slot may be any slot in a radio frame.

Figure 4B:
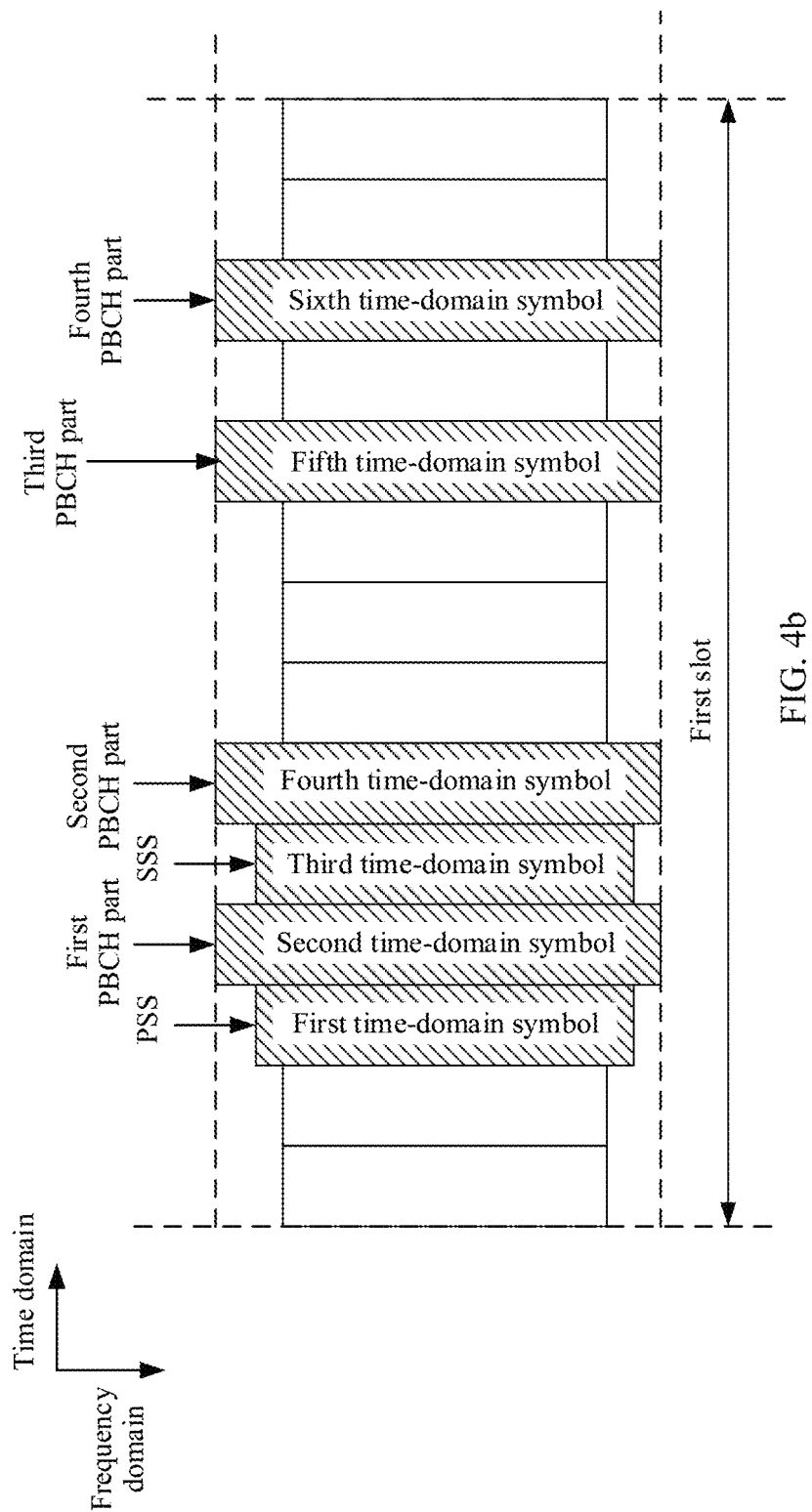
FIG. 4b is another schematic diagram of an SSB design according to an embodiment of this application.

For example, the first time-domain symbol to the fourth time-domain symbol may be consecutive time-domain symbols in a first slot, and the fifth time-domain symbol and the sixth time-domain symbol may alternatively be non-consecutive time-domain symbols in the first slot. For example, as shown in FIG. 4b, in the first slot, the first time-domain symbol to the sixth time-domain symbol are sorted in a time domain sequence, and may be respectively the first time-domain symbol, the second time-domain symbol, the third time-domain symbol, the fourth time-domain symbol, the fifth time-domain symbol, and the sixth time-domain symbol. In addition, the first time-domain symbol is adjacent to the second time-domain symbol, the second time-domain symbol is adjacent to the third time-domain symbol, and the third time-domain symbol is adjacent to the fourth time-domain symbol. The fourth time-domain symbol is not adjacent to the fifth time-domain symbol. Optionally, the fourth time-domain symbol and the fifth time-domain symbol may be separated by three time-domain symbols. The fifth time-domain symbol is not adjacent to the sixth time-domain symbol. Optionally, the fifth time-domain symbol and the sixth time-domain symbol may be separated by one time-domain symbol. The first time-domain symbol may be used to carry the PSS, the second time-domain symbol may be used to carry the first PBCH part, the third time-domain symbol may be used to carry the SSS, the fourth time-domain symbol may be used to carry the second PBCH part, the fifth time-domain symbol may be used to carry the third PBCH part, and the sixth time-domain symbol may be used to carry the fourth PBCH part.

Figure 4C:
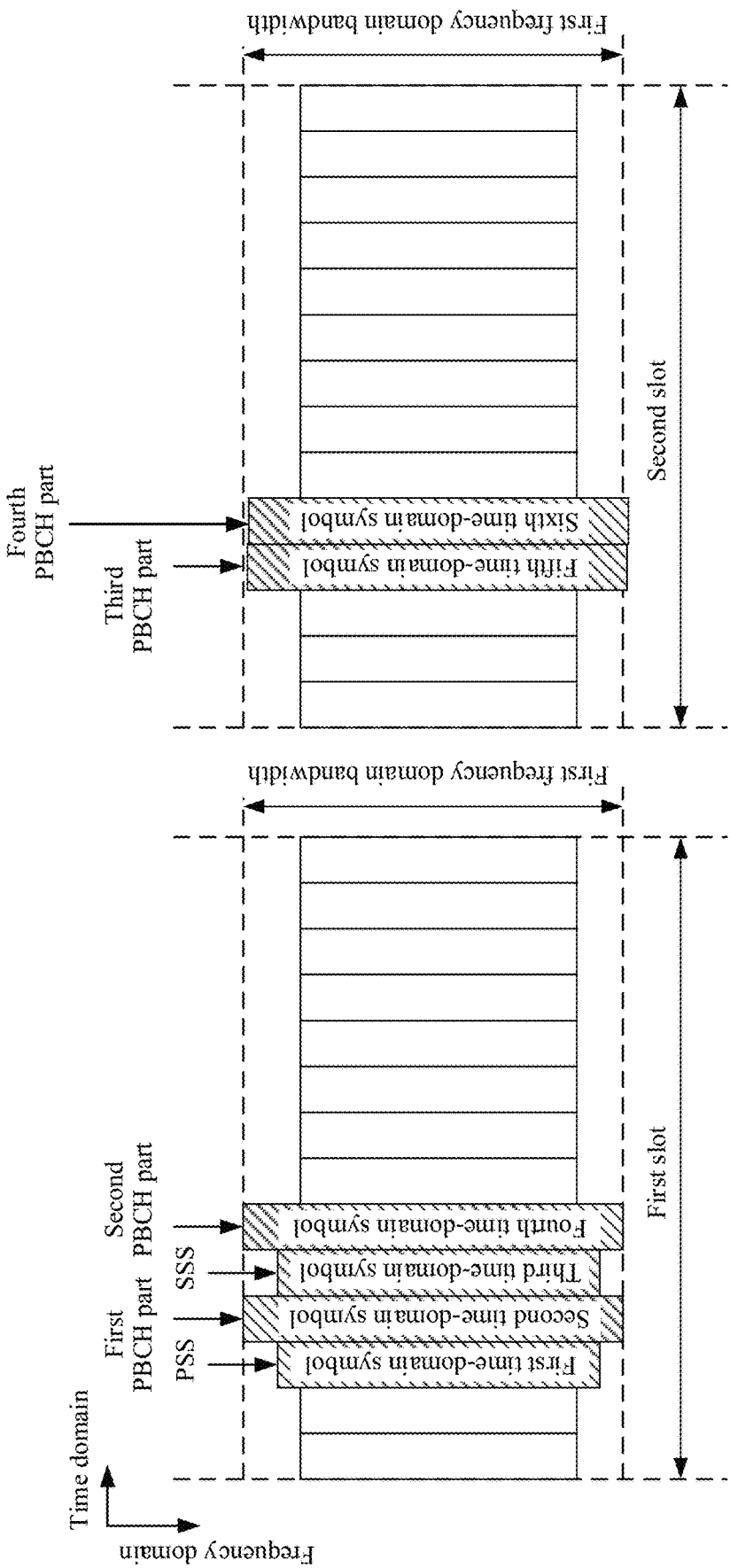
FIG. 4c is still another schematic diagram of an SSB design according to an embodiment of this application.

For example, the first time-domain symbol to the fourth time-domain symbol may be consecutive time-domain symbols in a first slot, the fifth time-domain symbol and the sixth time-domain symbol may be located in a second slot, and the fifth time-domain symbol and the sixth time-domain symbol are consecutive time-domain symbols in the second time domain. It may be understood that, in this embodiment of this application, the "second slot" is merely used to distinguish from the "first slot", and the second slot may be any slot other than the first slot in a radio frame. This is not limited. For example, as shown in FIG. 4c, in the first slot, the first time-domain symbol to the fourth time-domain symbol are sorted in a time domain sequence, and may be respectively the first time-domain symbol, the second time-domain symbol, the third time-domain symbol, and the fourth time-domain symbol. In addition, the first time-domain symbol is adjacent to the second time-domain symbol, the second time-domain symbol is adjacent to the third time-domain symbol, and the third time-domain symbol is adjacent to the fourth time-domain symbol. In addition, the first time-domain symbol is used to carry the PSS, the second time-domain symbol is used to carry the first PBCH part, the third time-domain symbol is used to carry the SSS, and the fourth time-domain symbol is used to carry the second PBCH part. In the second slot, the fifth time-domain symbol and the sixth time-domain symbol are sorted in the time-domain sequence, and may be respectively the fifth time-domain symbol and the sixth time-domain symbol. The fifth time-domain symbol is adjacent to the sixth time-domain symbol. The fifth time-domain symbol is used to carry the third PBCH part, and the sixth time-domain symbol is used to carry the fourth PBCH. It may be understood that, in the example shown in FIG. 4c, an example in which the fifth time-domain symbol is adjacent to the sixth time-domain symbol in the second slot is used for description, and does not constitute a limitation on this application. For example, in the second slot, the fifth time-domain symbol may not be adjacent to the sixth time-domain symbol. For example, in the second slot, the fifth time-domain symbol and the sixth time-domain symbol may be separated by one or more time-domain symbols.

Optionally, in the design of Example 1, the procedure shown in FIG. 3 may further include: The network device sends a second signal. Correspondingly, the terminal device receives the second signal.

The second signal includes a second PBCH. The second PBCH includes a fifth PBCH part, a sixth PBCH part, the first PBCH part in the first PBCH, and the second PBCH part in the first PBCH. The fifth PBCH part and the sixth PBCH part are mapped to the second time-domain symbol, the third time-domain symbol, and the fourth time-domain symbol in Example 1. It can be learned from the description of Example 1 that, the second time-domain symbol is used to carry the first PBCH part, the third time-domain symbol is used to carry the SSS, and the fourth time-domain symbol is used to carry the second PBCH part. Therefore, frequency domain resources of the fifth PBCH part and the sixth PBCH part do not overlap frequency domain resources of the first PBCH part, the SSS, and the second PBCH part. For the design shown in FIG. 4a, FIG. 4b, or FIG. 4c, for locations of the frequency domain resources occupied by the fifth PBCH part and the sixth PBCH part, refer to FIG. 5a, FIG. 5b, or FIG. 5c. Details are not described herein again.

Figure 5A:
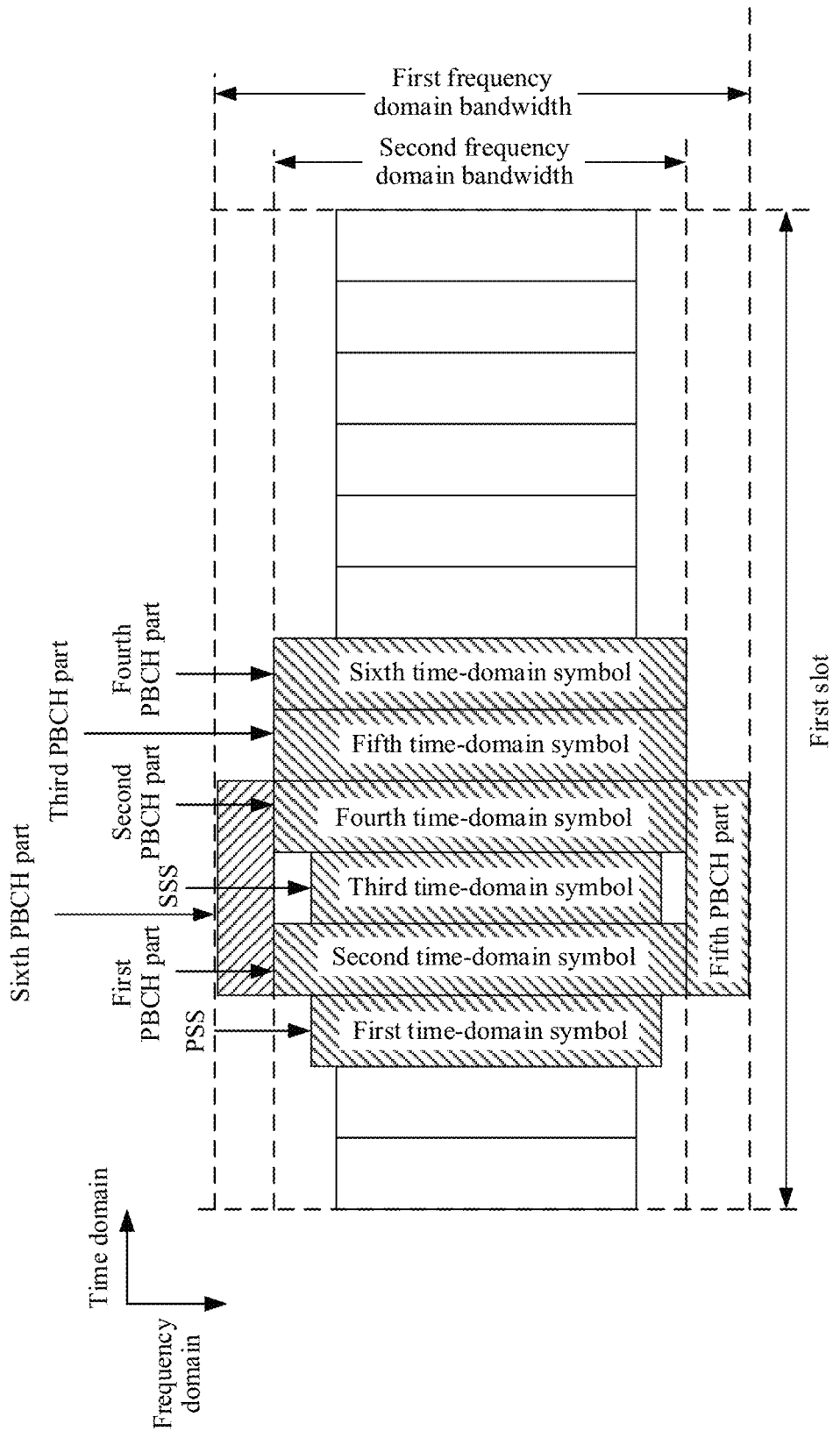
FIG. 5a is a schematic diagram of an SSB design according to an embodiment of this application.
Figure 5B:
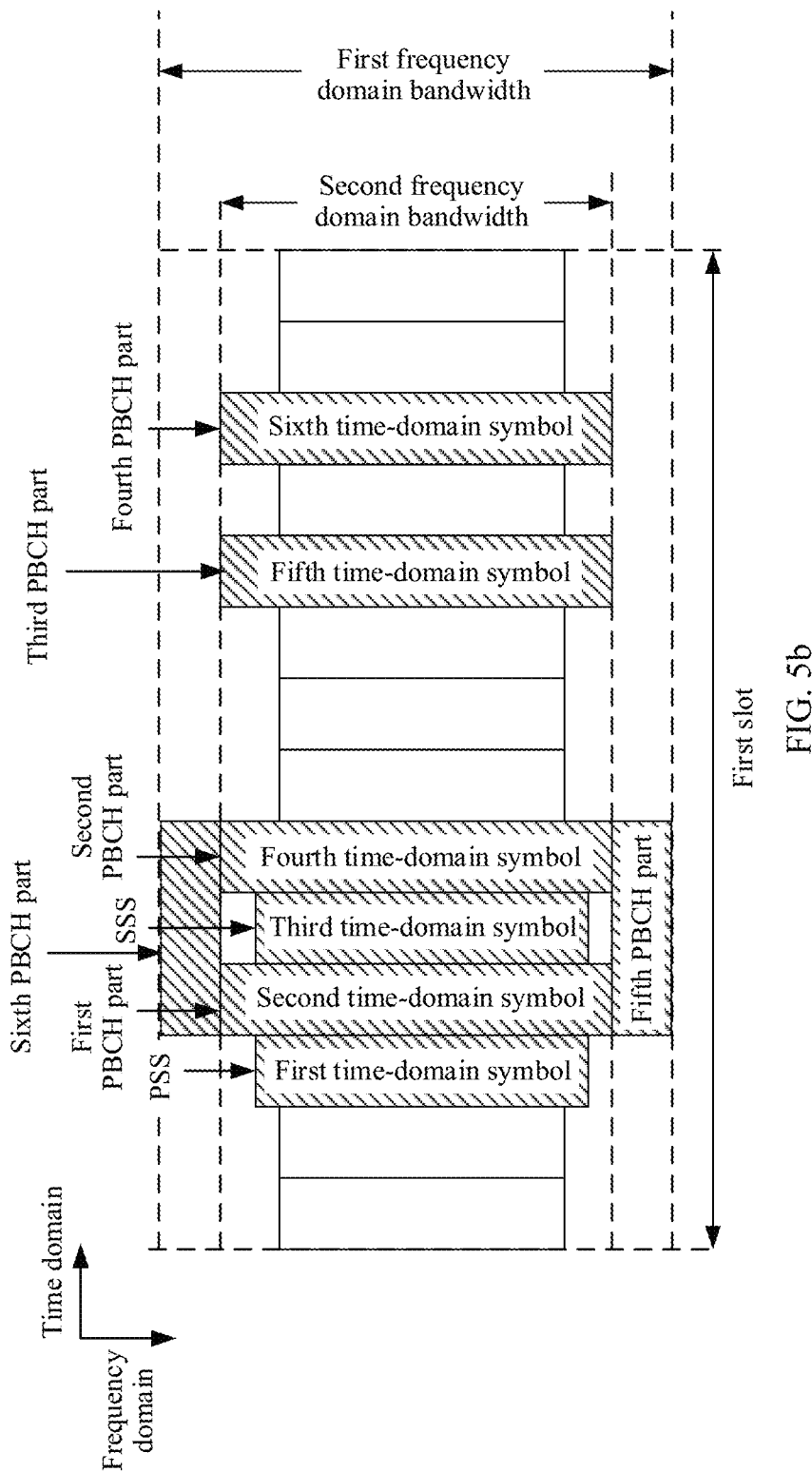
FIG. 5b is another schematic diagram of an SSB design according to an embodiment of this application.
Figure 5C:
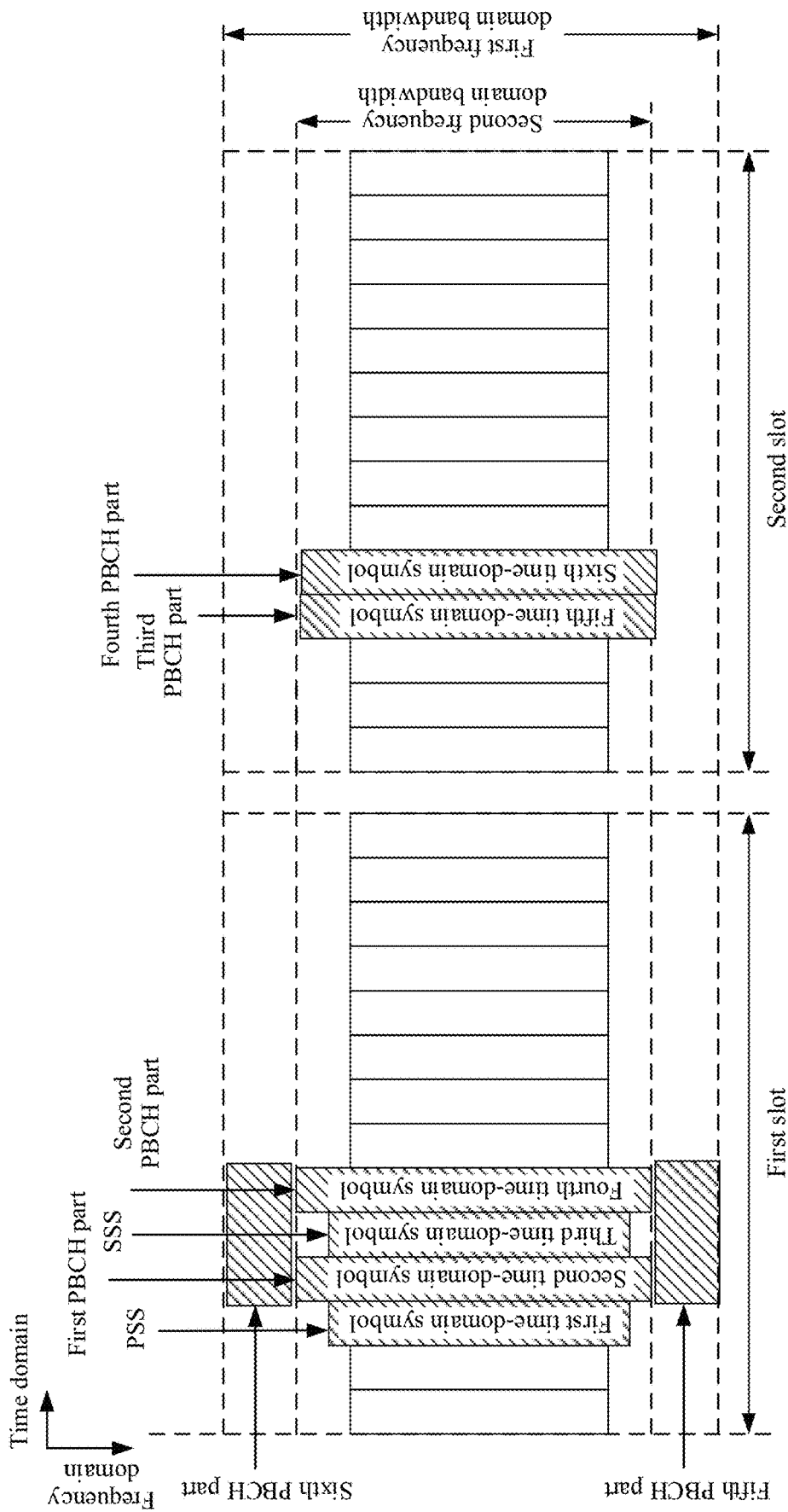
FIG. 5c is still another schematic diagram of an SSB design according to an embodiment of this application.

For example, as shown in FIG. 5a, FIG. 5b, or FIG. 5c, a first SSB may include the PSS, the SSS, the first PBCH part, the second PBCH part, the fifth PBCH part, and the sixth PBCH part, and a frequency domain bandwidth occupied by the first SSB may be a first frequency domain bandwidth. Optionally, the first frequency domain bandwidth may be 240 subcarriers, the first SSB may be referred to as a broadband SSB, and a terminal device that supports the first frequency domain bandwidth may be referred to as a broadband terminal device. A second SSB may include the PSS, the SSS, the first PBCH part, the second PBCH part, the third PBCH part, and the fourth PBCH part, and a frequency domain bandwidth occupied by the second SSB may be a second frequency domain bandwidth. Optionally, the second frequency domain bandwidth may be less than 240 subcarriers. For example, the second frequency domain bandwidth may be 144 subcarriers. The second SSB may be referred to as a narrowband SSB, and a terminal device that supports the second frequency domain bandwidth may be referred to as a narrowband terminal device.

It can be learned that, in the foregoing design, the broadband SSB and the narrowband SSB may share the PSS, the SSS, the first PBCH part, and the second PBCH part. Compared with a solution in which an independent SSB is separately configured for the broadband SSB and the narrowband SSB, this solution can save a time-frequency resource and improve resource utilization.

It should be noted that, in the designs shown in FIG. 5a to FIG. 5c, information carried on the fifth PBCH part and information carried on the third PBCH part may be the same or different, and information carried on the sixth PBCH part and information carried on the fourth PBCH part may be the same or different. If the information carried on the fifth PBCH part and the information carried on the third PBCH part are the same, and the information carried on the sixth PBCH part and the information carried on the fourth PBCH part are the same, a broadband terminal device and the narrowband terminal device may share same broadcast information, thereby reducing information overheads. If the information carried on the fifth PBCH part and the information carried on the third PBCH are different, and the information carried on the sixth PBCH part and the information carried on the fourth PBCH part are different, different configuration requirements of the broadband terminal device and the narrowband terminal device can be met.

Example 2

In this embodiment of this application, a frequency domain bandwidth occupied by the first signal is less than 240 subcarriers. For example, the frequency domain bandwidth occupied by the first signal may be 144 subcarriers. For a communication system in which one resource block RB includes 12 subcarriers, the 144 subcarriers may also be referred to as 12 resource blocks RBs. The first signal may occupy six time-domain symbols. The six time-domain symbols may be respectively a first time-domain symbol, a second time-domain symbol, a third time-domain symbol, a fourth time-domain symbol, a fifth time-domain symbol, and a sixth time-domain symbol.

The first signal may include the SSS, the PSS, and the first PBCH. The first PBCH includes a first PBCH part, a second PBCH part, a third PBCH part, and a fourth PBCH part. A process in which the PSS, the SSS, and the first PBCH are mapped to the different time-domain symbols may include: The PSS is mapped to the first time-domain symbol, the SSS is mapped to the second time-domain symbol, the first PBCH part is mapped to the third time-domain symbol, the second PBCH part is mapped to the fourth time-domain symbol, the third PBCH part is mapped to the fifth time-domain symbol, and the fourth PBCH part is mapped to the sixth time-domain symbol.

The first time-domain symbol to the sixth time-domain symbol may be located in a same slot, or may be located in different slots. The first time-domain symbol to the sixth time-domain symbol may be consecutive time-domain symbols or non-consecutive time-domain symbols. This is not limited herein.

Figure 6A:
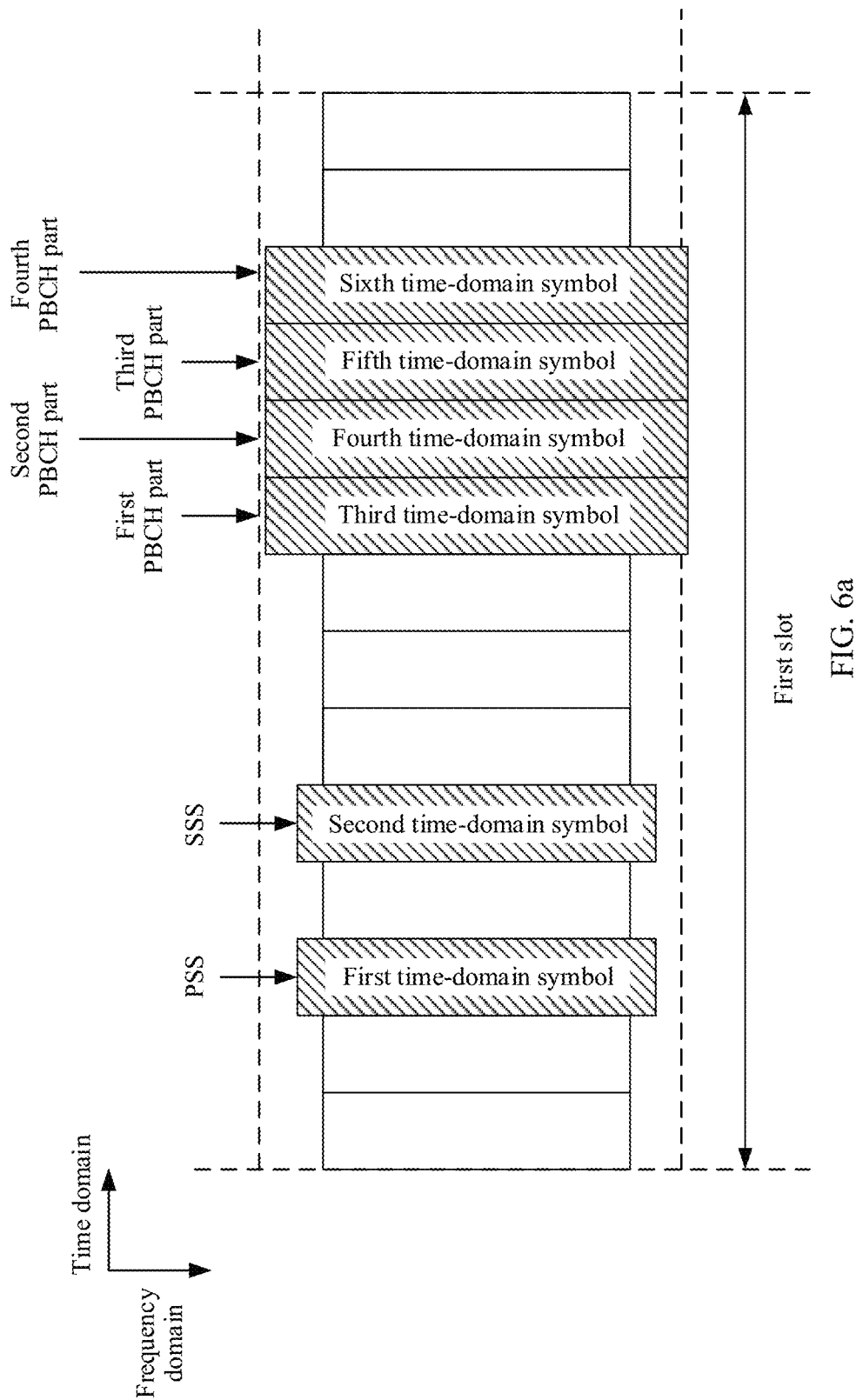
FIG. 6a is a schematic diagram of an SSB design according to an embodiment of this application.
Figure 6B:
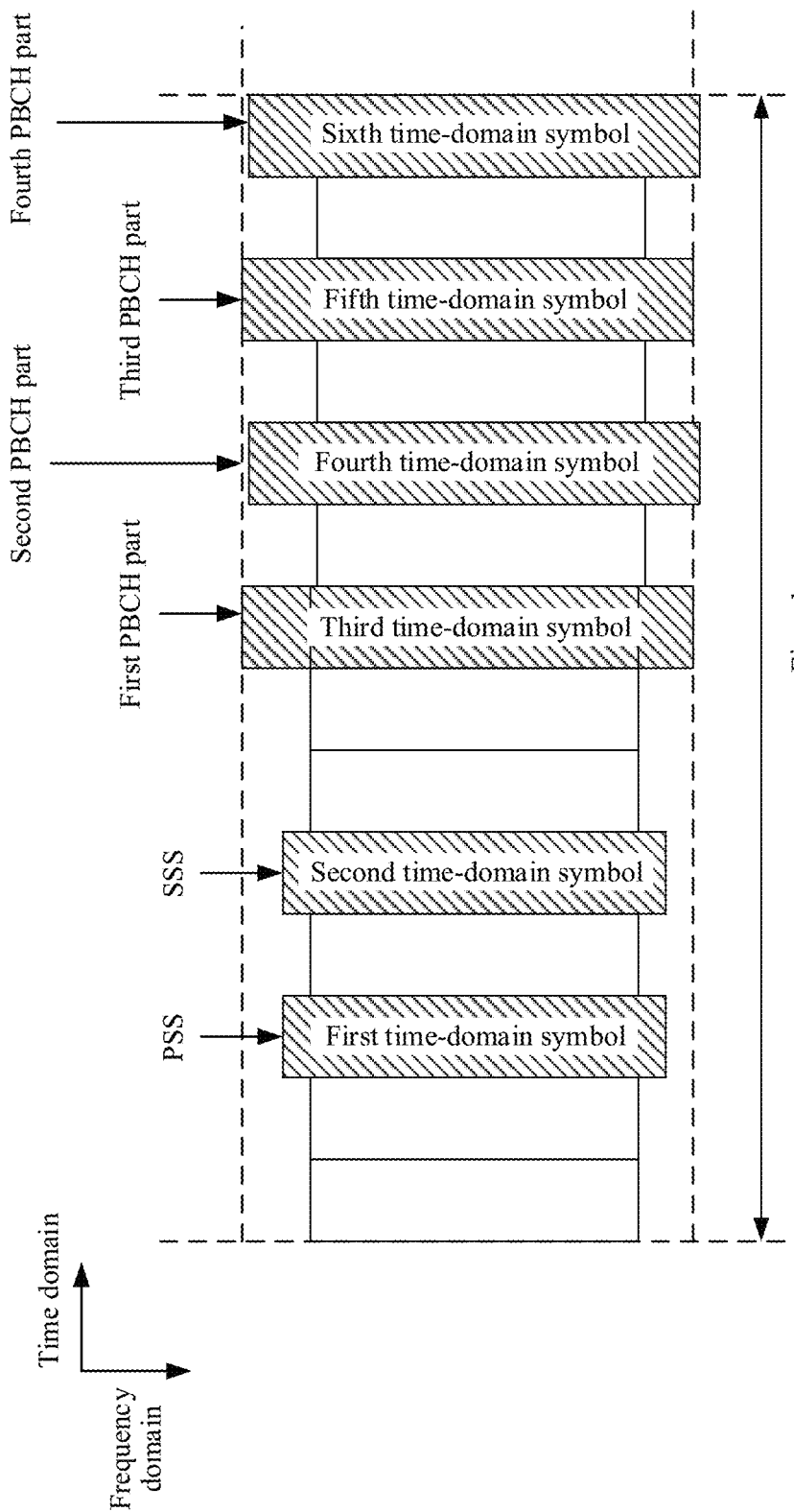
FIG. 6b is another schematic diagram of an SSB design according to an embodiment of this application.

For example, the first time-domain symbol and the second time-domain symbol may be non-consecutive time-domain symbols in a first slot, and the third time-domain symbol to the sixth time-domain symbol are consecutive time-domain symbols in the first slot. For example, as shown in FIG. 6a, in the first slot, the first time-domain symbol to the sixth time-domain symbol are sorted in a time domain sequence, and are sequentially the first time-domain symbol, the second time-domain symbol, a third slot symbol, a fourth slot symbol, a fifth slot symbol, and a sixth slot symbol. The first time-domain symbol is used to carry the PSS, the second time-domain symbol is used to carry the SSS, the third time-domain symbol is used to carry the first PBCH part, the fourth time-domain symbol is used to carry the second PBCH part, the fifth time-domain symbol is used to carry the third PBCH part, and the sixth time-domain symbol is used to carry the fourth PBCH part. The first time-domain symbol is not adjacent to the second time-domain symbol. For example, the first time-domain symbol and the second time-domain symbol may be separated by one time-domain symbol. The second time-domain symbol is not adjacent to the third time-domain symbol. For example, the second time-domain symbol and the third time-domain symbol may be separated by three time-domain symbols. The third time-domain symbol to the sixth time-domain symbol are adjacent. For another example, as shown in FIG. 6b, in a first slot, the first time-domain symbol to the sixth time-domain symbol are sorted in a time domain sequence, and are sequentially the first time-domain symbol, the second time-domain symbol, the third time-domain symbol, the fourth time-domain symbol, the fifth time-domain symbol, and the sixth time-domain symbol. The first time-domain symbol is used to carry the PSS, the second time-domain symbol is used to carry the SSS, the third time-domain symbol is used to carry the first PBCH part, the fourth time-domain symbol is used to carry the second PBCH part, the fifth time-domain symbol is used to carry the third PBCH part, and the sixth time-domain symbol is used to carry the fourth PBCH part. The first time-domain symbol and the second time-domain symbol are non-consecutive. For example, the first time-domain symbol and the second time-domain symbol may be separated by one time-domain symbol. The second time-domain symbol is not adjacent to the third time-domain symbol. For example, the second time-domain symbol and the third time-domain symbol may be separated by two time-domain symbols. The third time-domain symbol is not adjacent to the fourth time-domain symbol. For example, the third time-domain symbol and the fourth time-domain symbol may be separated by one time-domain symbol. The fourth time-domain symbol is not adjacent to the fifth time-domain symbol. For example, the fourth time-domain symbol and the fifth time-domain symbol may be separated by one time-domain symbol. The fifth time-domain symbol is not adjacent to the sixth time-domain symbol. For example, the fifth time-domain symbol and the sixth time-domain symbol may be separated by one time-domain symbol.

It should be noted that, in the examples shown in FIG. 6a and FIG. 6b, an example in which that "the third time-domain symbol to the sixth time-domain symbol" are located after "the first time-domain symbol and the second time-domain symbol" in time domain is used for description, and does not constitute a limitation on this application. For example, "the third time-domain symbol to the sixth time-domain symbol" may be located before or after the "first time-domain symbol and the second time-domain symbol" in time domain. In addition, in the examples shown in FIG. 6a and FIG. 6b, an example in which "the third time-domain symbol to the sixth time-domain symbol" and "the first time-domain symbol and the second time-domain symbol" are located in one slot is used for description, and does not constitute a limitation on this application. For example, "the first time-domain symbol and the second time-domain symbol" may be located in the first slot, "the third time-domain symbol to the sixth time-domain symbol" may be located in a second slot, the first slot and the second slot may be adjacent or nonadjacent slots, and "the third time-domain symbol to the sixth time-domain symbol" in the second slot may be adjacent or nonadjacent time-domain symbols.

It may be understood that, in this embodiment of this application, that two time-domain symbols are adjacent may also mean that the two time-domain symbols are consecutive. That the two time-domain symbols are adjacent or consecutive may mean that numbers of the two time-domain symbols are adjacent. For example, in a case of a normal cyclic prefix, one slot includes 14 time-domain symbols, and numbers of the time-domain symbols may be sequentially 0 to 13. In this case, a time-domain symbol whose number is 0 and a time-domain symbol whose number is 1 may be referred to as being adjacent or consecutive, a time-domain symbol whose number is 12 and a time-domain symbol whose number is 13 may be referred to as being adjacent or consecutive, and so on.

Optionally, in the design of Example 2, the procedure shown in FIG. 3 may further include: The network device sends a second signal. Correspondingly, the terminal device receives the second signal.

The second signal may include a second PBCH. The second PBCH may include a fifth PBCH part, a sixth PBCH part, a seventh PBCH part, and an eighth PBCH part. The fifth PBCH part is mapped to a seventh time-domain symbol, the sixth PBCH part is mapped to an eighth time-domain symbol, and the seventh PBCH part and the eighth PBCH part are mapped to the seventh time-domain symbol, the second time-domain symbol, and the eighth time-domain symbol. It can be learned from the foregoing description that, the seventh time-domain symbol is used to carry the fifth PBCH part, the eighth time-domain symbol is used to carry the sixth PBCH part, and the second time-domain symbol is used to carry the SSS. It may be understood that, frequency domain resources of the seventh PBCH part and the eighth PBCH part do not overlap frequency domain resources of the fifth PBCH part, the sixth PBCH part, and the SSS. For the design shown in FIG. 6a or FIG. 6b, for frequency domain resources occupied by the fifth PBCH part, the sixth PBCH part, the seventh PBCH part, and the eighth PBCH part, refer to FIG. 7a or FIG. 7b. Details are not described herein again.

Figure 7A:
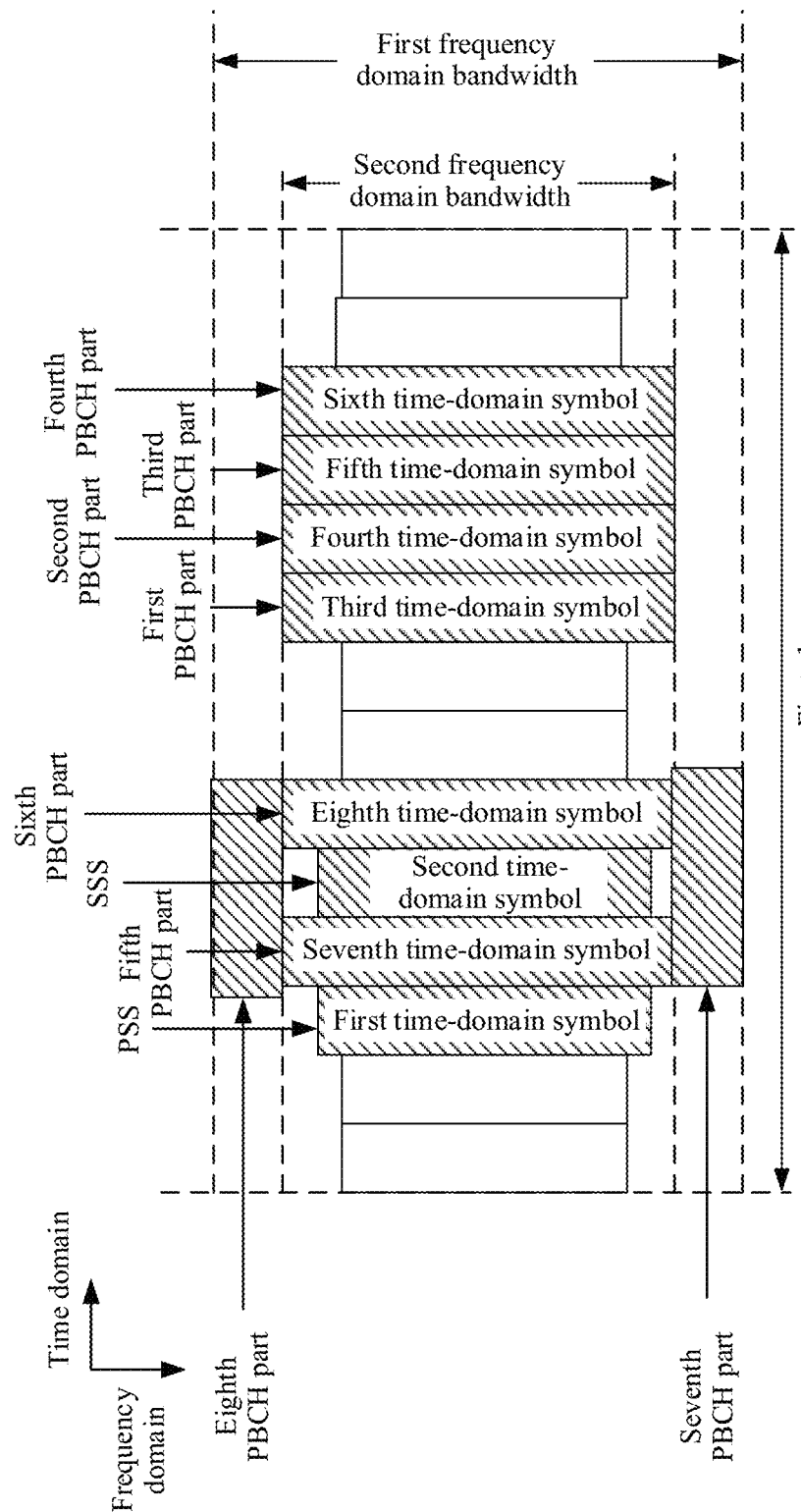
FIG. 7a is a schematic diagram of an SSB design according to an embodiment of this application.
Figure 7B:
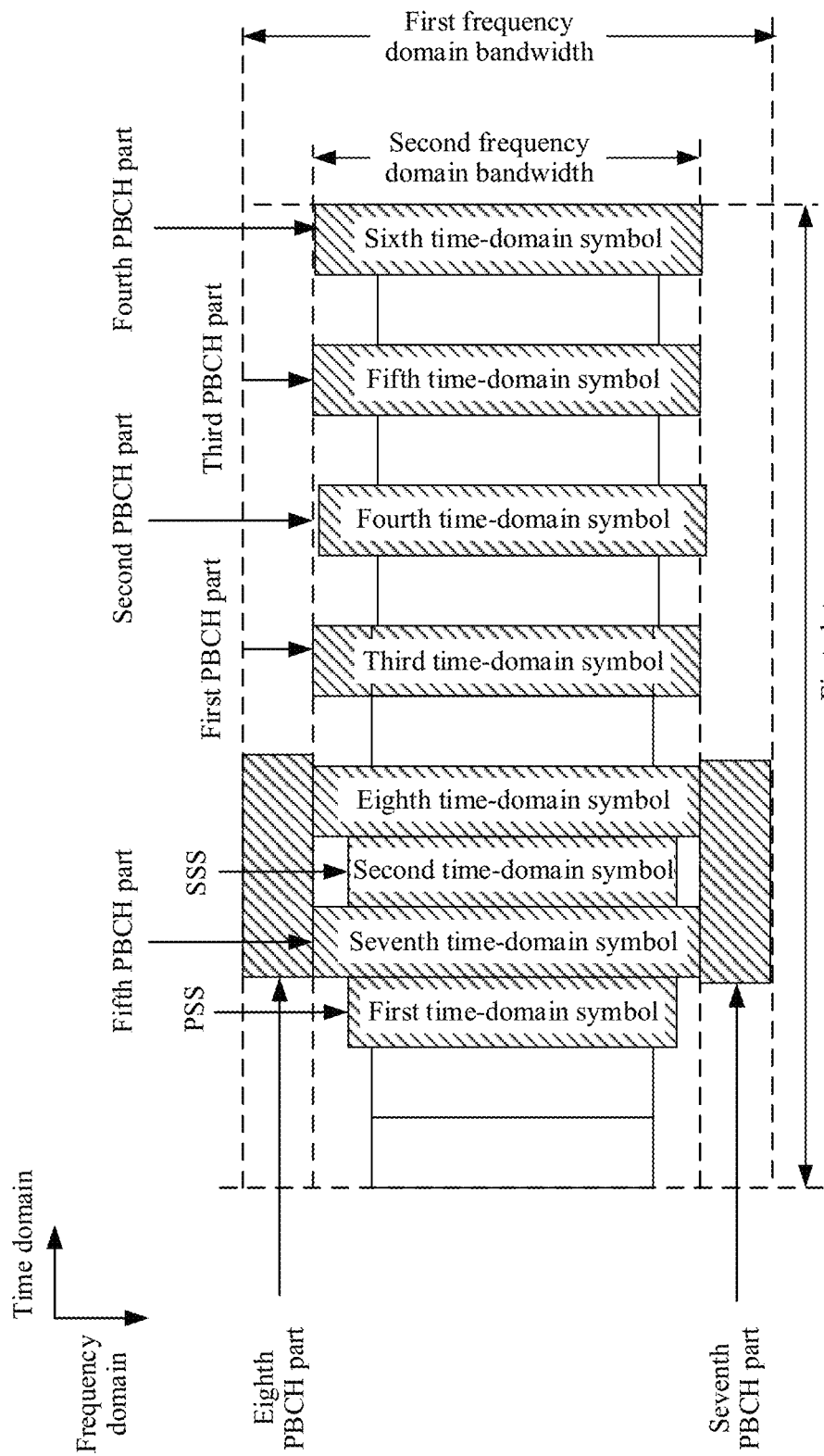
FIG. 7b is another schematic diagram of an SSB design according to an embodiment of this application.

For example, referring to FIG. 7a or FIG. 7b, a first SSB may include the PSS, the SSS, the fifth PBCH part, the sixth PBCH part, the seventh PBCH part, and the eighth PBCH part. That is, the first SSB may include the PSS, the SSS, a fifth PBCH part, a sixth PBCH part, a seventh PBCH part, and an eighth PBCH part. A frequency domain bandwidth occupied by the first SSB may be a first frequency domain bandwidth. Optionally, the first frequency domain bandwidth may be 240 subcarriers, the first SSB may be referred to as a broadband SSB, and a terminal device that supports the first frequency domain bandwidth may be referred to as a broadband terminal device. A second SSB may include the PSS, the SSS, the first PBCH part, the second PBCH part, the third PBCH part, and the fourth PBCH part. That is, the second SSB may include the PSS, the SSS, the first PBCH part, the second PBCH part, the third PBCH part, and the fourth PBCH part. A frequency domain bandwidth of the second SSB may be a second frequency domain bandwidth. Optionally, the second frequency domain bandwidth may be less than 240 subcarriers. For example, the second frequency domain bandwidth may be 144 subcarriers. The second SSB may be referred to as a narrowband SSB, and a terminal device that supports the second frequency domain bandwidth may be referred to as a narrowband terminal device.

It can be learned that, in this embodiment of this application, the broadband SSB and the narrowband SSB may share the PSS and the SSS. Compared with a solution in which an SSB is separately configured for the broadband SSB and the narrowband SSB, this solution can save a resource and improve resource utilization.

This application further provides a communication method. A principle of the communication method is as follows: N mapping sequences are predefined, and a network device maps PBCHs to time-frequency resources of the PBCHs in different mapping sequences, and sends the PBCHs on the time-frequency resources of the PBCHs. Correspondingly, terminal devices having different frequency domain bandwidths may receive the PBCHs on the time-frequency resources of the PBCHs. For example, two mapping sequences are predefined, and are respectively a first mapping sequence and a second mapping sequence. The network device may map a first PBCH to a time-frequency resource of the first PBCH in the first mapping sequence, and send the first PBCH on the time-frequency resource of the first PBCH. The network device may map a second PBCH to a time-frequency resource of the second PBCH in the second mapping sequence, and send the second PBCH on the time-frequency resource of the second PBCH. The terminal devices having the different frequency domain bandwidths receive PBCHs for different times, to obtain all information in the PBCH. For example, a terminal device having a first frequency domain bandwidth can obtain all the PBCH information by receiving a PBCH once. A terminal device having a second frequency domain bandwidth may can obtain all the PBCH information only by receiving PBCHs twice. According to the design method, the terminal devices having the different frequency domain bandwidths can share a PBCH. Compared with a solution in which a PBCH is separately configured for the terminal devices having the different frequency domain bandwidths, this solution can reduce resource consumption and improve resource utilization.

Figure 8:
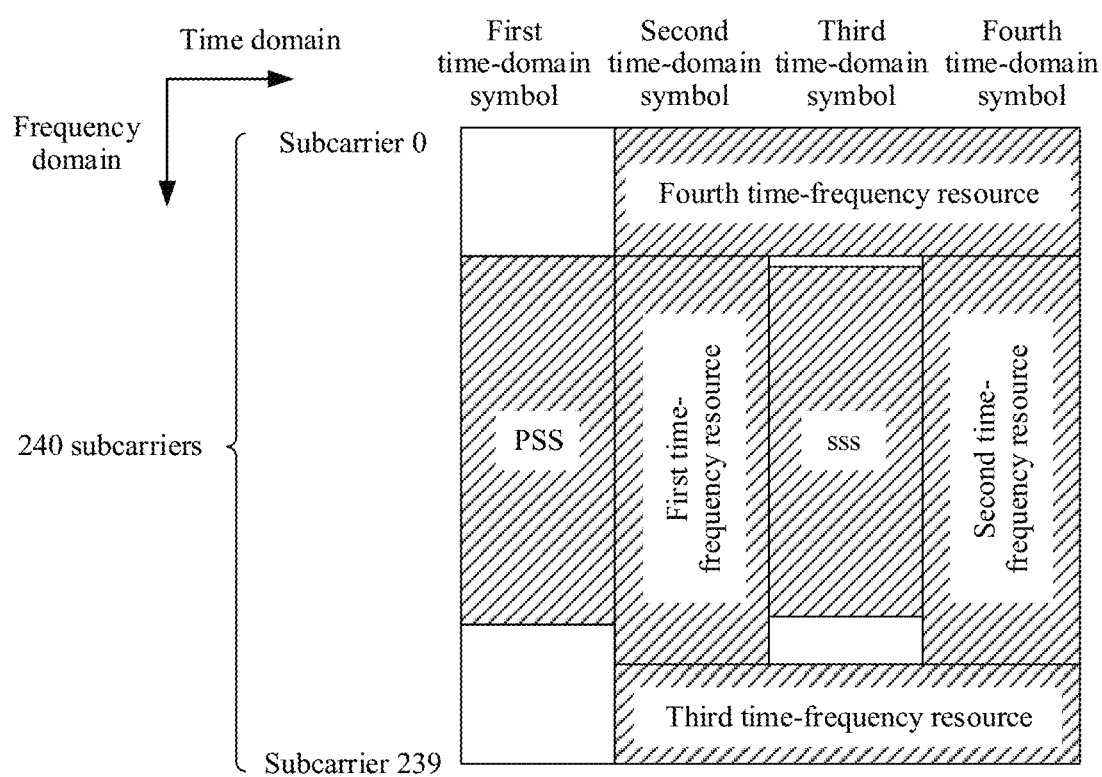
FIG. 8 is a schematic diagram of an SSB design according to an embodiment of this application.

In this embodiment of this application, a PBCH may include a plurality of parts, a time-frequency resource of the PBCH may include a plurality of parts, and a mapping sequence refers to a process in which the plurality of parts of the PBCH are mapped to the plurality of parts of the time-frequency resource of the PBCH in different sequences. For example, as shown in FIG. 8, the time-frequency resource of the PBCH may include four parts that are respectively a first time-frequency resource, a second time-frequency resource, a third time-frequency resource, and a fourth time-frequency resource. The PBCH may include four parts that are respectively a first PBCH part, a second PBCH part, a third PBCH part, and a fourth PBCH part. The mapping sequence may refer to a process in which the four parts of the PBCH are mapped to the four parts of the time-frequency resource in different sequences. For example, a definition may be that the first mapping sequence is: mapping the first PBCH part to the first time-frequency resource, mapping the second PBCH part to the second time-frequency resource, mapping the third PBCH part to the third time-frequency resource, and mapping the fourth PBCH part to the fourth time-frequency resource, and the second mapping sequence is: mapping the third PBCH part to the first time-frequency resource, mapping the fourth PBCH part to the second time-frequency resource, mapping the first PBCH part to the third time-frequency resource, and mapping the second PBCH part to the fourth time-frequency resource.

For example, the N mapping sequences may be predefined, and are respectively the first mapping sequence, the second mapping sequence, a third mapping sequence, and the like, until an $N^{th}$ mapping sequence. The N mapping sequences are different from each other. The network device may map the first PBCH to the time-frequency resource of the first PBCH in the first mapping sequence, and send the first PBCH on the time-frequency resource of the first PBCH; maps the second PBCH to the time-frequency resource of the second PBCH in the second mapping sequence, and sends the second PBCH on the time-frequency resource of the second PBCH, and so on, until the network device maps an $N^{th}$ PBCH to a time-frequency resource of the $N^{th}$ PBCH in the $N^{th}$ mapping sequence, and sends the $N^{th}$ PBCH on the time-frequency resource of the $N^{th}$ PBCH. It may be understood that, broadcast messages carried on the first PBCH, the second PBCH, and so on, until the $N^{th}$ PBCH may be the same or different. Words such as "first", "second", and "$N^{th}$" are merely used to distinguish between PBCHs sent at different time points, and do not have other meanings. Correspondingly, the terminal devices having the different frequency domain bandwidths may receive the different quantities of PBCHs, to obtain all information in the PBCH. For example, a broadband terminal device can obtain all the PBCH information by receiving one PBCH. A terminal device having a first narrowband may obtain all the PBCH information by receiving two PBCHs. A terminal device having a second narrowband may obtain all the PBCH information by receiving four PBCHs.

For example, as shown in FIG. 8, the first PBCH may belong to a first SSB. In time domain, the first SSB occupies four consecutive time-domain symbols that are respectively a first time-domain symbol, a second time-domain symbol, a third time-domain symbol, and a fourth time-domain symbol. In frequency domain, the first SSB occupies 240 consecutive subcarriers, and numbers of the 240 subcarriers are sequentially from 0 to 239.

The first OFDM symbol from left to right is used to carry a PSS, the second OFDM symbol from left to right is used to carry the first PBCH, the third OFDM symbol from left to right is used to carry an SSS and the first PBCH, and the fourth OFDM symbol from left to right is used to carry the first PBCH. In this embodiment of this application, as shown in FIG. 8, the time-frequency resource used to carry the first PBCH (namely, the time-frequency resource of the first PBCH) may be divided into four parts that are respectively the first time-frequency resource, the second time-frequency resource, the third time-frequency resource, and the fourth time-frequency resource. For example, the first time-frequency resource may include subcarriers whose numbers are 48 to 191 in the $2^{nd}$ time-domain symbol in the first SSB; the second time-frequency resource includes subcarriers whose numbers are 48 to 191 in the $4^{th}$ time-domain symbol in the first SSB; the third time frequency resource includes subcarriers whose numbers are 192 to 239 in the $2^{nd}$ time-domain symbol, the $3^{rd}$ time-domain symbol, and the $4^{th}$ time-domain symbol in the first SSB; the fourth time-frequency resource includes subcarriers whose numbers are 0 to 47 in the $2^{nd}$ time-domain symbol, the $3^{rd}$ time-domain symbol, and the $4^{th}$ time-domain symbol in the SSB.

In this embodiment of this application, the first PBCH may be divided into four parts that are respectively the first PBCH part, the second PBCH part, the third PBCH part, and the fourth PBCH part. The four parts of the PBCH may be mapped to the four time-frequency resources in the first mapping sequence.

For example, the second PBCH may belong to a second SSB. Still referring to FIG. 8, in time domain, the second SSB occupies four consecutive time-domain symbols that are respectively a first time-domain symbol, a second time-domain symbol, a third time-domain symbol, and a fourth time-domain symbol. In frequency domain, the second SSB occupies 240 consecutive subcarriers, and the numbers of the 240 subcarriers are 0 to 239.

The first OFDM symbol from left to right is used to carry a PSS, the second OFDM symbol from left to right is used to carry the second PBCH, the third OFDM symbol from left to right is used to carry an SSS and the second PBCH, and the fourth OFDM symbol from left to right is used to carry the second PBCH. In this embodiment of this application, as shown in FIG. 8, the time-frequency resource used to carry the second PBCH (namely, the time-frequency resource of the second PBCH) may be divided into four parts that are respectively the first time-frequency resource, the second time-frequency resource, the third time-frequency resource, and the fourth time-frequency resource.

In this embodiment of this application, the second PBCH may be divided into four parts that are respectively the first PBCH part, the second PBCH part, the third PBCH part, and the fourth PBCH part. The four parts of the PBCH may be mapped to the four time-frequency resources in the second mapping sequence.

It may be understood that, a time domain sequence of the first SSB and the second SSB is not limited in this embodiment of this application. For example, the first SSB and the second SSB may be located in a same slot or different slots, and the first SSB is earlier or later than the second SSB in time domain.

Figure 9:
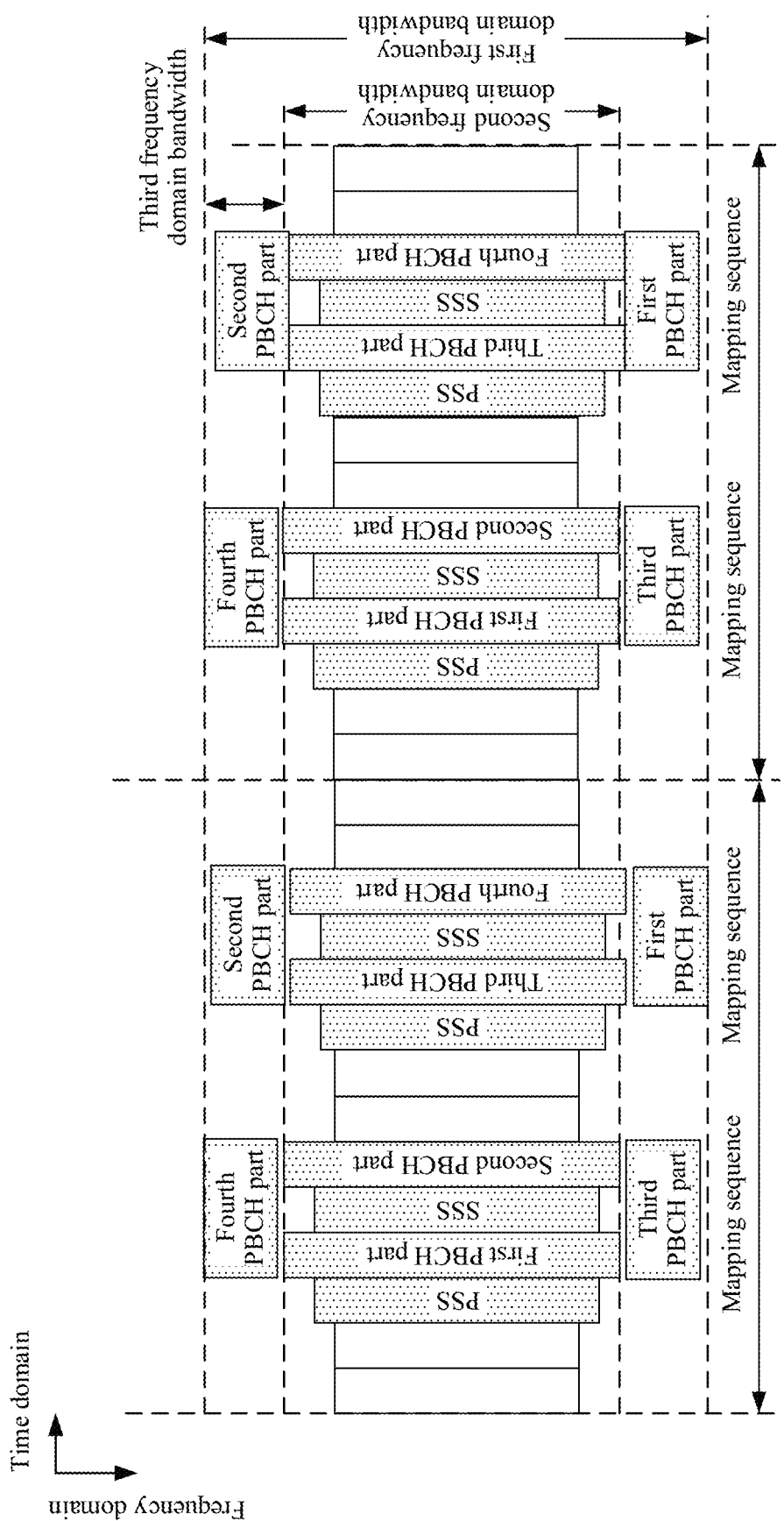
FIG. 9 is a schematic diagram of a mapping sequence according to an embodiment of this application.

In a design, at least two mapping sequences may be defined. That is, a value of N in the N mapping sequences is greater than or equal to 2. As shown in FIG. 9, the first mapping sequence or the second mapping sequence may be at least one of the following.

The first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource.

The first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource.

As shown in FIG. 9, the terminal device having the first frequency domain bandwidth can obtain an entire PBCH by receiving one SSB. For example, the first frequency domain bandwidth may be but is not limited to 20 resource blocks, and the terminal device supporting the first frequency domain bandwidth may also be referred to as a terminal device having a broad bandwidth. The terminal device having the second frequency domain bandwidth can obtain the entire PBCH by receiving two SSBs. For example, the second frequency domain bandwidth may be but is not limited to 12 resource blocks, and the terminal device supporting the second frequency domain bandwidth may also be referred to as a terminal device having a narrow bandwidth. A terminal device having a third frequency domain bandwidth can obtain the entire PBCH by receiving four SSBs. The terminal device having the third frequency domain bandwidth may separately receive two SSBs on an upper boundary of the SSBs, to obtain the second PBCH part and the fourth PBCH part, and receive two SSBs on a lower boundary of the SSBs, to obtain the first PBCH part and the third PBCH part. That is, the terminal device having the third frequency domain bandwidth may receive the PBCH in a frequency hopping manner. For example, the third frequency domain bandwidth may be but is not limited to four resource blocks, and the terminal device supporting the third frequency domain bandwidth may also be referred to as the terminal device having the narrow bandwidth.

An advantage of using this design is that the terminal devices having the plurality of bandwidths can share the PBCH. For example, in the foregoing design manner, the terminal devices having the different bandwidths can share a PBCH in a same bandwidth SSB. Compared with a solution in which a PBCH is separately configured for a terminal device having each type of bandwidth, this solution can save a time-frequency resource and improve utilization of the time-frequency resource.

For example, the first PBCH may belong to the first SSB, the second PBCH may belong to the second SSB, the third PBCH may belong to a third SSB, and the fourth PBCH may belong to a fourth SSB. For the first SSB, the second SSB, the third SSB, and the fourth SSB, refer to the descriptions of the first SSB and the second SSB in FIG. 8. Details are not described herein again. The resource that is in the first SSB and that carries the first PBCH may be referred to as the time-frequency resource of the first PBCH, the resource that is in the second SSB and that carries the second PBCH may be referred to as the time-frequency resource of the second PBCH, a resource that is in the third SSB and that carries the third PBCH may be referred to as a time-frequency resource of the third PBCH, and a resource that is in the fourth SSB and that carries the fourth PBCH may be referred to as a time-frequency resource of the fourth PBCH.

In this embodiment of this application, the first PBCH, the second PBCH, the third PBCH, or the fourth PBCH may be divided into four parts, and numbers of the four parts are respectively a first PBCH part to a fourth PBCH part. The time-frequency resource of the first PBCH, the time-frequency resource of the second PBCH, the time-frequency resource of the third PBCH, and the time-frequency resource of the fourth PBCH each are divided into four parts, and numbers of the four parts are respectively a first time-frequency resource to a fourth time-frequency resource.

In this embodiment of this application, the network device may map the first PBCH to the time-frequency resource of the first PBCH in the first mapping sequence, and send the first PBCH on the time-frequency resource of the first PBCH. The network device may map the second PBCH to the time-frequency resource of the second PBCH in the second mapping sequence, and send the second PBCH on the time-frequency resource of the second PBCH. The network device may map the third PBCH to the time-frequency resource of the third PBCH in the third mapping sequence, and send the third PBCH on the time-frequency resource of the third PBCH. The network device may map the fourth PBCH to the time-frequency resource of the fourth PBCH in the fourth mapping sequence. Correspondingly, a terminal device may receive the first PBCH on the time-frequency resource of the first PBCH, receive the second PBCH on the time-frequency resource of the second PBCH, receive the third PBCH on the time-frequency resource of the third PBCH, and receive the fourth PBCH on the time-frequency resource of the fourth PBCH.

Figure 10:
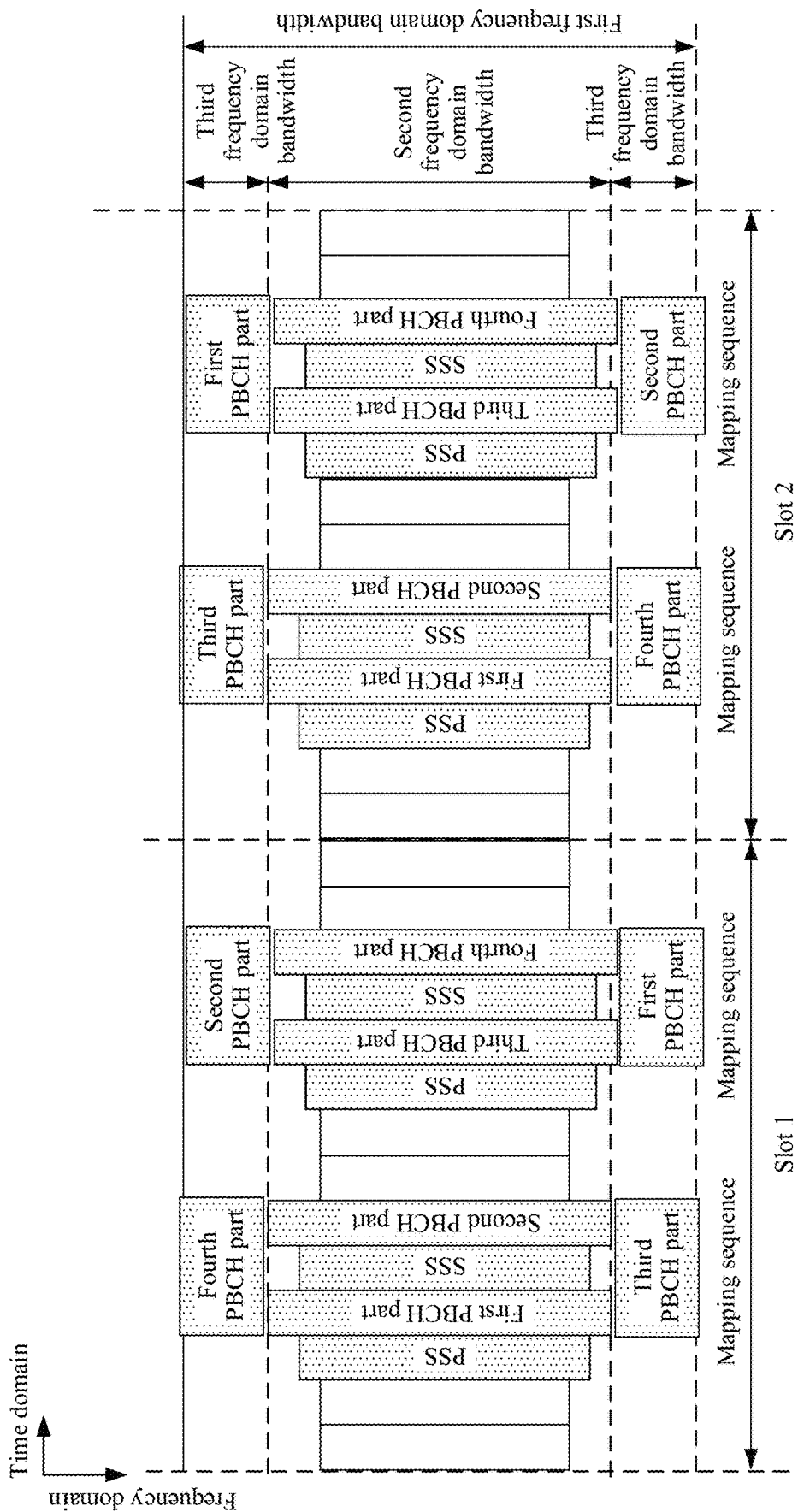
FIG. 10 is another schematic diagram of a mapping sequence according to an embodiment of this application.

In a design, as shown in FIG. 10, at least four mapping sequences may be defined. To be specific, a value of N in the N mapping sequences is greater than or equal to 4, and any one of the first mapping sequence, the second mapping sequence, the third mapping sequence, and the fourth mapping sequence may be as follows.

The first PBCH part is mapped to the first time-frequency resource, the second PBCH part is mapped to the second time-frequency resource, the third PBCH part is mapped to the third time-frequency resource, and the fourth PBCH part is mapped to the fourth time-frequency resource;

the first PBCH part is mapped to the third time-frequency resource, the second PBCH part is mapped to the fourth time-frequency resource, the third PBCH part is mapped to the first time-frequency resource, and the fourth PBCH part is mapped to the second time-frequency resource;

the first PBCH part is mapped to the first time-frequency resource, the second PBCH part is mapped to the second time-frequency resource, the third PBCH part is mapped to the fourth time-frequency resource, and the fourth PBCH part is mapped to the third time-frequency resource; or the first PBCH part is mapped to the fourth time-frequency resource, the second PBCH part is mapped to the third time-frequency resource, the third PBCH part is mapped to the first time-frequency resource, and the fourth PBCH part is mapped to the second time-frequency resource.

Still referring to FIG. 10, the terminal device having the first frequency domain bandwidth can obtain an entire PBCH by receiving one SSB. For example, the first frequency domain bandwidth may be 20 resource blocks, and the terminal device supporting the first frequency domain bandwidth may also be referred to as the broadband terminal device. The terminal device having the second frequency domain bandwidth can obtain the entire PBCH by receiving two SSBs. For example, the second frequency domain bandwidth may be 12 resource blocks, and the terminal device supporting the second frequency domain bandwidth may also be referred to as a narrowband terminal device. A terminal device having a third frequency domain bandwidth can obtain the entire PBCH by receiving four SSBs, for example, the terminal device having the third frequency domain bandwidth may continuously receive four SSBs in an upper sideband or a lower sideband of an entire SSB bandwidth. The terminal device supporting the third frequency domain bandwidth may also be referred to as the narrowband terminal device.

According to this design, terminal devices having the different bandwidths can share a PBCH in a same bandwidth SSB. Compared with a solution in which a PBCH is separately configured for a terminal device having each type of bandwidth, this solution can save a time-frequency resource and improve resource utilization.

For example, the first PBCH may belong to the first SSB, and the second PBCH may belong to the second SSB. The time-frequency resource that is in the first SSB and that is used to carry the first PBCH is referred to as the time-frequency resource of the first PBCH, and the time-frequency resource that is in the second SSB and that is used to carry the second PBC is referred to as the time-frequency resource of the second PBCH. In this embodiment of this application, the time-frequency resource of the first PBCH or the time-frequency resource of the second PBCH may be divided into 14 parts, and numbers of the 14 parts are respectively a first time-frequency resource to a fourteenth time-frequency resource. The first PBCH and the second PBCH each are divided into 12 parts, and numbers of the 12 parts are respectively a first PBCH part to a twelfth PBCH part.

In this embodiment of this application, the network device may map the first PBCH to the first PBCH time-frequency resource in the first mapping sequence, and send the first PBCH on time-frequency resource of the first PBCH. Correspondingly, the terminal device receives the first PBCH on the time-frequency resource of the first PBCH. The network device may map the second PBCH to the time-frequency resource of the second PBCH in the second mapping sequence, and send the second PBCH on the time-frequency resource of the second PBCH. Correspondingly, the terminal device may receive the second PBCH on the time-frequency resource of the second PBCH. The first mapping sequence or the second mapping sequence may be a sequence of mapping the 12 parts of the PBCH to the 14 parts of the time-frequency resource.

Figure 11:
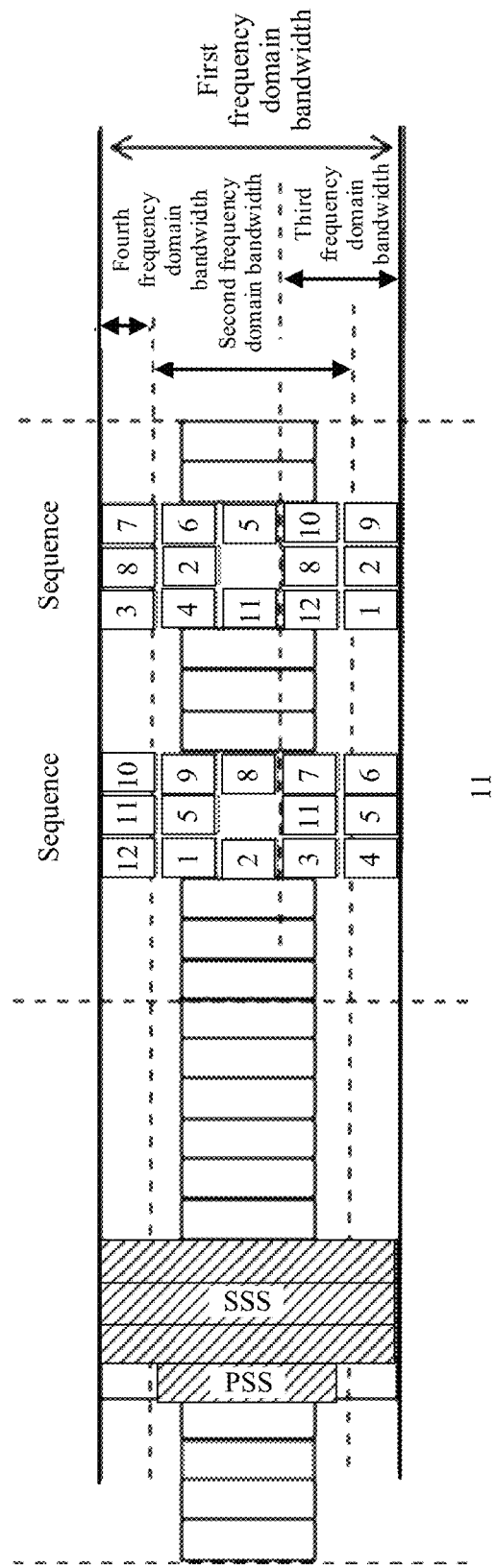
FIG. 11 is still another schematic diagram of a mapping sequence according to an embodiment of this application.

In a design, as shown in FIG. 11, the first mapping sequence or the second mapping sequence may be either of the following:

a twelfth PBCH part is mapped to a first time-frequency resource, a first PBCH part is mapped to a second time-frequency resource, a second PBCH part is mapped to a third time-frequency resource, a third PBCH part is mapped to a fourth time-frequency resource, a fourth PBCH part is mapped to a fifth time-frequency resource, a eleventh PBCH part is mapped to a sixth time-frequency resource, a fifth PBCH part is mapped to a seventh time-frequency resource, the eleventh PBCH part is mapped to an eighth time-frequency resource, the fifth PBCH part is mapped to a ninth time-frequency resource, a tenth PBCH part is mapped to a tenth time-frequency resource, a ninth PBCH part is mapped to an eleventh time-frequency resource, an eighth PBCH part is mapped to a twelfth time-frequency resource, a seventh PBCH part is mapped to a thirteenth time-frequency resource, and a sixth PBCH part is mapped to a fourteenth time-frequency resource; or a third PBCH part is mapped to a first time-frequency resource, a fourth PBCH part is mapped to a second time-frequency resource, an eleventh PBCH part is mapped to a third time-frequency resource, a twelfth PBCH part is mapped to a fourth time-frequency resource, a first PBCH part is mapped to a fifth time-frequency resource, an eighth PBCH part is mapped to a sixth time-frequency resource, a second PBCH part is mapped to a seventh time-frequency resource, the eighth PBCH part is mapped to an eighth time-frequency resource, the second PBCH part is mapped to a ninth time-frequency resource, a seventh PBCH part is mapped to a tenth time-frequency resource, a sixth PBCH part is mapped to an eleventh time-frequency resource, a fifth PBCH part is mapped to a twelfth time-frequency resource, a tenth PBCH part is mapped to a thirteenth time-frequency resource, and a ninth PBCH part is mapped to a fourteenth time-frequency resource.

It may be learned from FIG. 11 that, in this embodiment of this application, the terminal device having the first frequency domain bandwidth can obtain a complete broadcast message by receiving one PBCH. For example, the first frequency domain bandwidth may be 20 resource blocks RBs, and the terminal device having the first frequency domain bandwidth may also be referred to as the broadband terminal device. The terminal device having the second frequency domain bandwidth can obtain the complete broadcast message only by receiving two consecutive PBCHs. For example, the second frequency domain bandwidth may be 12 resource blocks, and the terminal device having the second frequency domain bandwidth may also be referred to as the terminal device having the first narrowband. A terminal device having a third frequency domain bandwidth can obtain the complete broadcast message only by receiving two consecutive PBCHs, and needs to receive one PBCH on an upper boundary and receive one PBCH on a lower boundary. For example, the third frequency domain bandwidth may be eight resource blocks, and the terminal device having the third frequency domain bandwidth may also be referred to as the terminal device having the second narrowband. A terminal device having a fourth frequency domain bandwidth can obtain the complete broadcast message only by receiving four consecutive PBCHs, and needs to receive two PBCHs on the upper boundary and receive two PBCHs one the lower boundary. For example, the fourth frequency domain bandwidth may be four resource blocks, and the terminal device having the fourth frequency domain bandwidth may also be referred to as a terminal device having a third narrowband.

In this design manner, the terminal devices having the different bandwidths can share a PBCH in a same broadband SSB. Compared with a solution in which a separate PBCH is configured for a terminal having each bandwidth, this solution can greatly save a resource and improve resource utilization.

Based on the foregoing description, as shown in FIG. 12, a procedure of a communication method is provided. A network device in the procedure may be the network device 110 in FIG. 1, and a terminal device may be the terminal device 120 in FIG. 1. The procedure may include the following steps.

S120: The network device maps a first PBCH to a target time domain resource in a first mapping sequence, where the first mapping sequence is one of N mapping sequences, and N is a positive integer greater than 1.

S121: The network device sends the first PBCH on the target time-frequency resource.

S122: The terminal device receives the first PBCH on the target time-frequency resource.

Optionally, the procedure shown in FIG. 12 may further include S123: The terminal device processes the first PBCH.

Optionally, the procedure shown in FIG. 12 may further include: The network device maps a second PBCH to a target time-frequency resource in a second mapping sequence, and sends the second PBCH on the target time-frequency resource. Correspondingly, the terminal device receives the second PBCH, processes the second PBCH, and so on. For the first mapping sequence and the second mapping sequence, refer to the descriptions in FIG. 9 and FIG. 11. Details are not described herein again. It should be noted that, the target time-frequency resource used to send the first PBCH is the time-frequency resource of the first PBCH, and the target time-frequency resource used to send the second PBCH is the time-frequency resource of the second PBCH. For the time-frequency resource of the first PBCH and the time-frequency resource of the second PBCH, refer to the descriptions in FIG. 9 and FIG. 11.

Optionally, the procedure shown in FIG. 12 may further include: The network device maps the second PBCH to the target time-frequency resource in the second mapping sequence; the network device sends the second PBCH on the target time-frequency resource; correspondingly, the terminal device receives the second PBCH, processes the second PBCH, and so on.

The network device maps a third PBCH to a target time-frequency resource in a third mapping sequence; the network device sends the third PBCH on the target time-frequency resource; correspondingly, the terminal device receives the third PBCH, processes the third PBCH, and so on.

The network device maps a fourth PBCH to a target time-frequency resource in a fourth mapping sequence; the network device sends the fourth PBCH on the target time-frequency resource; correspondingly, the terminal device receives the fourth PBCH, processes the fourth PBCH, and so on. It should be noted that, the target time-frequency resource used to send the first PBCH is the time-frequency resource of the first PBCH, the target time-frequency resource used to send the second PBCH is the time-frequency resource of the second PBCH, the target time-frequency resource used to send the third PBCH is the time-frequency resource of the third PBCH, and the target time-frequency resource used to send the fourth PBCH is the time-frequency resource of the fourth PBCH. For the time-frequency resource of the first PBCH, the time-frequency resource of the second PBCH, the time-frequency resource of the third PBCH, and the time-frequency resource of the fourth PBCH, refer to descriptions in FIG. 10.

In this embodiment of this application, terminal devices having different bandwidths can share a PBCH. Compared with a solution in which a PBCH is separately configured for the terminal devices having the different bandwidths, this solution can reduce overheads and improve resource utilization.

In the embodiments provided in this application, the methods provided in the embodiments of this application are described from perspectives of the network device, the terminal, and interaction between the network device and the terminal. To implement the functions of the methods provided in the embodiments of this application, both the network device and the terminal may include a hardware structure and/or a software module, to implement the functions in a form of the hardware structure, the software module, or a combination of the hardware structure and the software module. Whether one of the foregoing functions is performed by the hardware structure, the software module, or the combination of the hardware structure and the software module depends on a specific application and a design constraint of the technical solutions.

Figure 13:
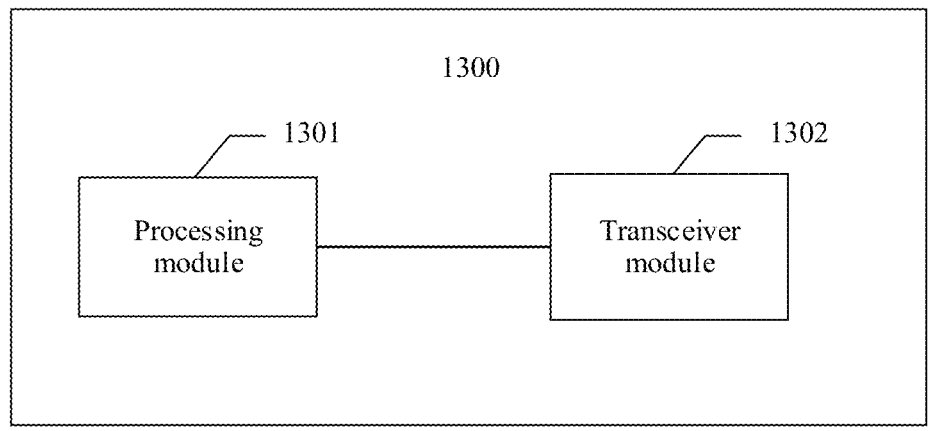
FIG. 13 is a schematic structural diagram of a communication apparatus according to an embodiment of this application.

Same as the foregoing concept, as shown in FIG. 13, this application further provides an apparatus 1300. The apparatus 1300 includes a processing module 1301 and a transceiver module 1302.

In an example, the apparatus 1300 is configured to implement functions of the network device in the foregoing methods. The apparatus 1300 may be a network device, or may be an apparatus in a network device.

For example, the processing module 1301 is configured to determine a first signal. The transceiver module 1302 is configured to send the first signal.

The first signal includes a primary synchronization signal PSS, a secondary synchronization signal SSS, and a first physical broadcast channel PBCH, a frequency domain bandwidth occupied by the PSS, the SSS, and the first PBCH is less than 240 subcarriers, and the PSS, the SSS, and the first PBCH are mapped to different time-domain symbols.

For example, the processing module 1301 is configured to map a first physical broadcast channel PBCH to a target time-frequency resource in a first mapping sequence. The transceiver module 1302 is configured to send the first PBCH on the target time-frequency resource. The first mapping sequence is one of N mapping sequences, and N is a positive integer greater than 1.

In an example, the apparatus 1300 may be configured to implement functions of the terminal device in the foregoing methods. The apparatus 1300 may be a terminal device, or may be an apparatus in a terminal device.

For example, the processing module 1301 is configured to receive a first signal. The transceiver module is configured to process the first signal. The first signal includes a primary synchronization signal PSS, a secondary synchronization signal SSS, and a first physical broadcast channel PBCH, a frequency domain bandwidth occupied by the PSS, the SSS, and the first PBCH is less than 240 subcarriers, and the PSS, the SSS, and the first PBCH are mapped to different time-domain symbols.

For example, the transceiver module 1302 is configured to receive a first physical broadcast channel PBCH on a target time-frequency resource. The processing module 1301 is configured to process the first PBCH. The first PBCH is mapped to the target time-frequency resource unit in a first mapping sequence, the first mapping sequence is one of N mapping sequences, and N is a positive integer greater than 1.

For specific execution processes of the processing module 1301 and the transceiver module 1302, refer to the descriptions in the foregoing method embodiments. Division into the modules in the embodiments of this application is an example, is only logical function division, and may be other division during actual implementation. In addition, function modules in the embodiments of this application may be integrated into one processor, or may exist alone physically, or two or more modules are integrated into one module. The integrated module may be implemented in a form of hardware, or may be implemented in a form of a software functional module.

Figure 14:
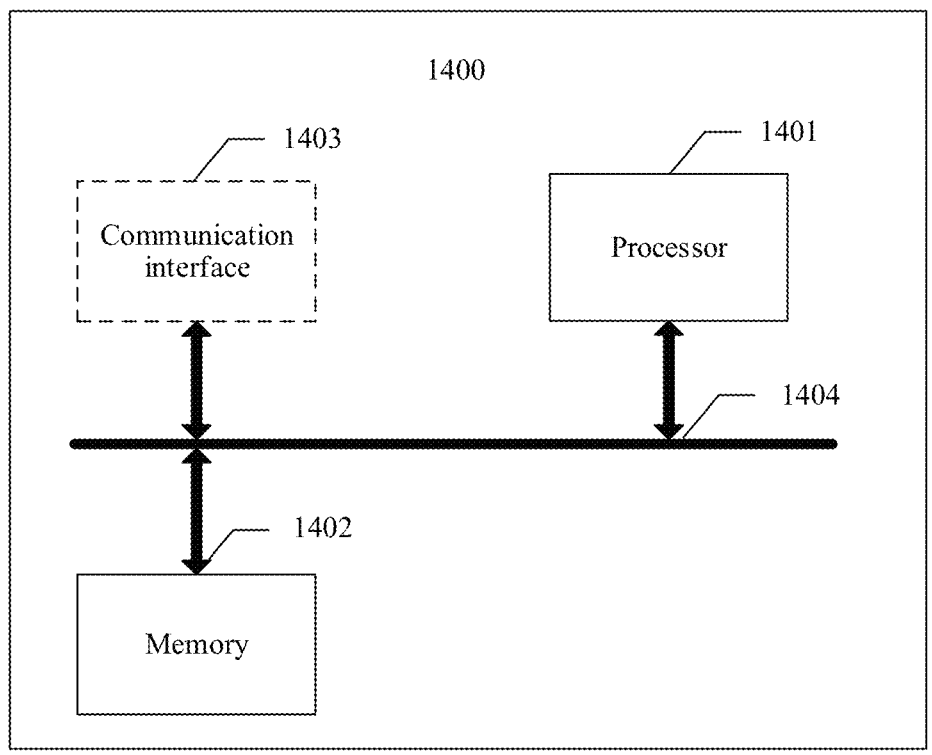
FIG. 14 is a schematic structural diagram of a communication apparatus according to an embodiment of this application.

Same as the foregoing concept, as shown in FIG. 14, an embodiment of this application provides an apparatus 1400.

In an example, the apparatus 1400 is configured to implement functions of the network device in the foregoing methods. The apparatus may be a network device, or may be an apparatus in a network device.

The apparatus 1400 includes at least one processor 1401, configured to implement the functions of the network device in the foregoing methods. For example, the processor 1401 may determine a first signal, or map a first PBCH to a target time-frequency resource in a first mapping sequence. For details, refer to the detailed descriptions in the methods. Details are not described herein again.

The apparatus 1400 may further include at least one memory 1402, configured to store program instructions and/or data. The memory 1402 is coupled to the processor 1401. Coupling in this embodiment of this application may be indirect coupling or a communication connection between apparatuses, units, or modules in an electrical form, a mechanical form, or another form, and is used for information exchange between the apparatuses, the units, or the modules. The processor 1401 may operate with the memory 1402. The processor 1401 may execute the program instructions stored in the memory 1402. At least one of the at least one memory may be included in the processor.

The apparatus 1400 may further include a communication interface 1403, configured to communicate with another device through a transmission medium, so that an apparatus in the apparatus 1400 can communicate with the another device. For example, the communication interface 1403 may be a transceiver, a circuit, a bus, a module, or a communication interface of another type, and the another device may be a terminal device. The processor 1401 sends and receives data through the communication interface 1403, and is configured to implement the methods in the foregoing method embodiments. For example, the processor 1401 may send the first signal by using the communication interface 1403, or send the first PBCH on the target time-frequency resource.

In an example, the apparatus 1400 is configured to implement functions of the terminal device in the foregoing method. The apparatus may be a terminal device, or may be an apparatus in a terminal device.

The apparatus 1400 includes at least one processor 1401, configured to implement the functions of the terminal device in the foregoing methods. For example, the processor 1401 may process a first signal, or process a first PBCH. For details, refer to the detailed descriptions in the methods. Details are not described herein again.

The apparatus 1400 may further include at least one memory 1402, configured to store program instructions and/or data. The memory 1402 is coupled to the processor 1401. Coupling in this embodiment of this application may be indirect coupling or a communication connection between apparatuses, units, or modules in an electrical form, a mechanical form, or another form, and is used for information exchange between the apparatuses, the units, or the modules. The processor 1401 may operate with the memory 1402. The processor 1401 may execute the program instructions stored in the memory 1402. At least one of the at least one memory may be included in the processor.

The apparatus 1400 may further include a communication interface 1403, configured to communicate with another device through a transmission medium, so that an apparatus in the apparatus 1400 can communicate with the another device. For example, the communication interface 1403 may be a transceiver, a circuit, a bus, a module, or a communication interface of another type, and the another device may be a network device. The processor 1401 sends and receives data through the communication interface 1403, and is configured to implement the methods in the foregoing method embodiments. For example, the processor 1401 may receive the first signal by using the communication interface 1403, or receive the first PBCH on a target time-frequency resource.

In this embodiment of this application, a connection medium between the communication interface 1403, the processor 1401, and the memory 1402 is not limited. In this embodiment of this application, the memory 1402, the processor 1401, and the communication interface 1403 are connected through a bus 1404 in FIG. 14, and the bus is represented by a thick line in FIG. 14. A manner of a connection between other components is merely schematically described, and is not limited thereto. The bus may be classified into an address bus, a data bus, a control bus, and the like. For ease of representation, only one thick line is used to represent the bus in the FIG. 14, but this does not mean that there is only one bus or only one type of bus.

In the embodiments of this application, the processor may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a non-volatile memory, for example, a hard disk drive (hard disk drive, HDD) or a solid-state drive (solid-state drive, SSD); or may be a volatile memory (volatile memory), for example, a random-access memory (random-access memory, RAM). The memory is any other medium that can be used to carry or store expected program code in a form of an instruction or a data structure and that can be accessed by a computer. However, this is not limited thereto. The memory in the embodiments of this application may alternatively be a circuit or any other apparatus that can implement a storage function, and is configured to store a program instruction and/or data.

All or some of the foregoing methods provided in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, a network device, user equipment, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

Obviously, a person skilled in the art can make various modifications and variations to this application without departing from the scope of this application. This application is intended to cover these modifications and variations of this application provided that they fall within the scope of the claims of this application and their equivalent technologies.

In the embodiments of this application, "at least one" means one or more, and "a plurality of" means two or more than two. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may represent: a, b, c, a and b, a and c, b and c, or a, b, and c, and a, b, and c may be singular or plural.

What is claimed is:

1. A communication method, comprising:
   determining, by a network device, a first signal, wherein
      the first signal comprises a primary synchronization signal (PSS), a secondary synchronization signal (SSS), and a first physical broadcast channel (PBCH),
      the first PBCH comprises a first PBCH part, a second PBCH part, a third PBCH part, and a fourth PBCH part,
      a frequency domain bandwidth occupied by the PSS, the SSS, and the first PBCH is less than 240 subcarriers, and
      the PSS, the SSS, and the first PBCH are mapped to different time-domain symbols such that the PSS is mapped to a first time-domain symbol, the first PBCH part is mapped to a second time-domain symbol, the SSS is mapped to a third time-domain symbol, the second PBCH part is mapped to a fourth time-domain symbol, the third PBCH part is mapped to a fifth time-domain symbol, and the fourth PBCH part is mapped to a sixth time-domain symbol;
   sending, by the network device, the first signal; and
   sending, by the network device, a second signal, wherein
      the second signal comprises a second PBCH, the second PBCH comprises a fifth PBCH part, a sixth PBCH part, the first PBCH part, and the second PBCH part,
      the fifth PBCH part and the sixth PBCH part are mapped to the second time-domain symbol, the third time-domain symbol, and the fourth time-domain symbol, and
      frequency domain resources of the fifth PBCH part and the sixth PBCH part do not overlap with frequency domain resources of the first PBCH part, the SSS, and the second PBCH part.

2. The method according to claim 1, wherein
   the first time-domain symbol to the fourth time-domain symbol are consecutive time-domain symbols in a first slot, and the fifth time-domain symbol and the sixth time-domain symbol are consecutive in the first slot.

3. The method according to claim 1, wherein
   the first time-domain symbol to the fourth time-domain symbol are consecutive time-domain symbols in a first slot, and the fifth time-domain symbol and the sixth time-domain symbol are non-consecutive time-domain symbols in the first slot.

4. The method according to claim 1, wherein
   the first time-domain symbol to the fourth time-domain symbol are consecutive time-domain symbols in a first slot, and the fifth time-domain symbol and the sixth time-domain symbol are consecutive time-domain symbols in a second slot, and
   the first slot is different from the second slot.

5. The method according to claim 1, wherein
   the first time-domain symbol to the fourth time-domain symbol are consecutive time-domain symbols in a first slot, and the fifth time-domain symbol and the sixth time-domain symbol are non-consecutive time-domain symbols in a second slot, and
   the first slot is different from the second slot.

6. A communication method, comprising:
  receiving, by a terminal device, a first signal, wherein
    the first signal comprises a primary synchronization signal (PSS), a secondary synchronization signal (SSS), and a first physical broadcast channel (PBCH),
    the first PBCH comprises a first PBCH part, a second PBCH part, a third PBCH part, and a fourth PBCH part,
    a frequency domain bandwidth occupied by the PSS, the SSS, and the first PBCH is less than 240 sub-carriers, and
    the PSS, the SSS, and the first PBCH are mapped to different time-domain symbols such that the PSS is mapped to a first time-domain symbol, the first PBCH part is mapped to a second time-domain symbol, the SSS is mapped to a third time-domain symbol, the second PBCH part is mapped to a fourth time-domain symbol, the third PBCH part is mapped to a fifth time-domain symbol, and the fourth PBCH part is mapped to a sixth time-domain symbol;
  processing, by the terminal device, the first signal; and
  receiving, by the terminal device, a second signal, wherein
    the second signal comprises a second PBCH, the second PBCH comprises a fifth PBCH part, a sixth PBCH part, the first PBCH part, and the second PBCH part,
    the fifth PBCH part and the sixth PBCH part are mapped to the second time-domain symbol, the third time-domain symbol, and the fourth time-domain symbol, and
    frequency domain resources of the fifth PBCH part and the sixth PBCH part do not overlap with frequency domain resources of the first PBCH part, the SSS, and the second PBCH part.

7. The method according to claim 6, wherein
  the first time-domain symbol to the fourth time-domain symbol are consecutive time-domain symbols in a first slot, and the fifth time-domain symbol and the sixth time-domain symbol are consecutive in the first slot.

8. The method according to claim 6, wherein
  the first time-domain symbol to the fourth time-domain symbol are consecutive time-domain symbols in a first slot, and the fifth time-domain symbol and the sixth time-domain symbol are non-consecutive time-domain symbols in the first slot.

9. The method according to claim 6, wherein
  the first time-domain symbol to the fourth time-domain symbol are consecutive time-domain symbols in a first slot, and the fifth time-domain symbol and the sixth time-domain symbol are consecutive time-domain symbols in a second slot, and
  the first slot is different from the second slot.

10. The method according to claim 6, wherein
  the first time-domain symbol to the fourth time-domain symbol are consecutive time-domain symbols in a first slot, and the fifth time-domain symbol and the sixth time-domain symbol are non-consecutive time-domain symbols in a second slot, and
  the first slot is different from the second slot.

11. An apparatus, comprising:
  a memory storing program instructions; and
  a processor in communication with the memory, wherein when the processor executes the program, the apparatus is caused to:
    determine a first signal, wherein
      the first signal comprises a primary synchronization signal (PSS), a secondary synchronization signal (SSS), and a first physical broadcast channel (PBCH),
      the first PBCH comprises a first PBCH part, a second PBCH part, a third PBCH part, and a fourth PBCH part,
      a frequency domain bandwidth occupied by the PSS, the SSS, and the first PBCH is less than 240 sub-carriers, and
      the PSS, the SSS, and the first PBCH are mapped to different time-domain symbols such that the PSS is mapped to a first time-domain symbol, the first PBCH part is mapped to a second time-domain symbol, the SSS is mapped to a third time-domain symbol, the second PBCH part is mapped to a fourth time-domain symbol, the third PBCH part is mapped to a fifth time-domain symbol, and the fourth PBCH part is mapped to a sixth time-domain symbol;
    send the first signal; and
    send a second signal, wherein
      the second signal comprises a second PBCH, the second PBCH comprises a fifth PBCH part, a sixth PBCH part, the first PBCH part, and the second PBCH part,
      the fifth PBCH part and the sixth PBCH part are mapped to the second time-domain symbol, the third time-domain symbol, and the fourth time-domain symbol, and
      frequency domain resources of the fifth PBCH part and the sixth PBCH part do not overlap with frequency domain resources of the first PBCH part, the SSS, and the second PBCH part.

12. The apparatus according to claim 11, wherein
  the first time-domain symbol to the fourth time-domain symbol are consecutive time-domain symbols in a first slot, and the fifth time-domain symbol and the sixth time-domain symbol are consecutive in the first slot.

13. The apparatus according to claim 11, wherein
  the first time-domain symbol to the fourth time-domain symbol are consecutive time-domain symbols in a first slot, and the fifth time-domain symbol and the sixth time-domain symbol are non-consecutive time-domain symbols in the first slot.

14. The apparatus according to claim 11, wherein
  the first time-domain symbol to the fourth time-domain symbol are consecutive time-domain symbols in a first slot, and the fifth time-domain symbol and the sixth time-domain symbol are consecutive time-domain symbols in a second slot, and
  the first slot is different from the second slot.

15. The apparatus according to claim 11, wherein
  the first time-domain symbol to the fourth time-domain symbol are consecutive time-domain symbols in a first slot, and the fifth time-domain symbol and the sixth time-domain symbol are non-consecutive time-domain symbols in a second slot, and
  the first slot is different from the second slot.

16. An apparatus, comprising:
  a memory storing program instructions; and
  a processor in communication with the memory, wherein when the processor executes the program, the apparatus is caused to:

receive a first signal, wherein
- the first signal comprises a primary synchronization signal (PSS), a secondary synchronization signal (SSS), and a first physical broadcast channel (PBCH),
- the first PBCH comprises a first PBCH part, a second PBCH part, a third PBCH part, and a fourth PBCH part,
- a frequency domain bandwidth occupied by the PSS, the SSS, and the first PBCH is less than 240 subcarriers, and
- the PSS, the SSS, and the first PBCH are mapped to different time-domain symbols such that the PSS is mapped to a first time-domain symbol, the first PBCH part is mapped to a second time-domain symbol, the SSS is mapped to a third time-domain symbol, the second PBCH part is mapped to a fourth time-domain symbol, the third PBCH part is mapped to a fifth time-domain symbol, and the fourth PBCH part is mapped to a sixth time-domain symbol;

process the first signal; and receiving a second signal, wherein
- the second signal comprises a second PBCH, the second PBCH comprises a fifth PBCH part, a sixth PBCH part, the first PBCH part, and the second PBCH part,
- the fifth PBCH part and the sixth PBCH part are mapped to the second time-domain symbol, the third time-domain symbol, and the fourth time-domain symbol, and
- frequency domain resources of the fifth PBCH part and the sixth PBCH part do not overlap with frequency domain resources of the first PBCH part, the SSS, and the second PBCH part.

17. The apparatus according to claim 16, wherein
the first time-domain symbol to the fourth time-domain symbol are consecutive time-domain symbols in a first slot, and the fifth time-domain symbol and the sixth time-domain symbol are consecutive in the first slot.

18. The apparatus according to claim 16, wherein
the first time-domain symbol to the fourth time-domain symbol are consecutive time-domain symbols in a first slot, and the fifth time-domain symbol and the sixth time-domain symbol are non-consecutive time-domain symbols in the first slot.

19. The apparatus according to claim 16, wherein
the first time-domain symbol to the fourth time-domain symbol are consecutive time-domain symbols in a first slot, and the fifth time-domain symbol and the sixth time-domain symbol are consecutive time-domain symbols in a second slot, and
the first slot is different from the second slot.

20. The apparatus according to claim 16, wherein
the first time-domain symbol to the fourth time-domain symbol are consecutive time-domain symbols in a first slot, and the fifth time-domain symbol and the sixth time-domain symbol are non-consecutive time-domain symbols in a second slot, and
the first slot is different from the second slot.

* * * * *